(12) United States Patent
Paquier et al.

(10) Patent No.: US 12,260,870 B2
(45) Date of Patent: Mar. 25, 2025

(54) INTERRUPT FOR NOISE-CANCELLING AUDIO DEVICES

(71) Applicant: Apple Inc., Cupertino, CA (US)

(72) Inventors: Baptiste P. Paquier, Saratoga, CA (US); Aram M. Lindahl, Menlo Park, CA (US); Adam E. Kriegel, Mountain View, CA (US); Kisun You, Campbell, CA (US); Sarang S. Ranade, San Jose, CA (US)

(73) Assignee: Apple Inc., Cupertino, CA (US)

( * ) Notice: Subject to any disclaimer, the term of this patent is extended or adjusted under 35 U.S.C. 154(b) by 867 days.

(21) Appl. No.: 17/378,634

(22) Filed: Jul. 16, 2021

(65) Prior Publication Data
US 2022/0020387 A1    Jan. 20, 2022

Related U.S. Application Data

(60) Provisional application No. 63/055,269, filed on Jul. 22, 2020, provisional application No. 63/053,459, filed on Jul. 17, 2020.

(51) Int. Cl.
| | | |
|---|---|---|
| *G10L 21/0208* | (2013.01) | |
| *G06N 20/00* | (2019.01) | |
| *G10L 15/08* | (2006.01) | |
| *G10L 17/02* | (2013.01) | |

(52) U.S. Cl.
CPC .......... *G10L 21/0208* (2013.01); *G06N 20/00* (2019.01); *G10L 15/08* (2013.01); *G10L 17/02* (2013.01); *G10L 2015/088* (2013.01)

(58) Field of Classification Search
CPC ..... G10L 21/0208; G10L 15/08; G10L 17/02; G10L 2015/088; G06N 20/00

USPC ........................................................ 704/200
See application file for complete search history.

(56) References Cited

U.S. PATENT DOCUMENTS

| | | | |
|---|---|---|---|
| 8,155,334 B2 | 4/2012 | Joho et al. | |
| 10,129,633 B1 | 11/2018 | Patil et al. | |
| 2007/0154046 A1 | 7/2007 | Mishan | |
| 2008/0130908 A1 | 6/2008 | Cohen et al. | |
| 2011/0296194 A1* | 12/2011 | Herkes | G06F 21/34 |
| | | | 726/19 |
| 2013/0293723 A1 | 11/2013 | Benson et al. | |

(Continued)

FOREIGN PATENT DOCUMENTS

| | | |
|---|---|---|
| CN | 103888267 A | 6/2014 |
| CN | 106937194 A | 7/2017 |

(Continued)

OTHER PUBLICATIONS

Feng et al., "Continuous Authentication for Voice Assistants", MobiCom'17, Oct. 16020, 2017 (Year: 2017).*

(Continued)

*Primary Examiner* — Tsu-Chang Lee
(74) *Attorney, Agent, or Firm* — BAKERHOSTETLER

(57) ABSTRACT

Implementations of the subject technology provide systems and methods for determining whether to interrupt a user of an audio device that is operating in a noise-cancelling mode of operation. For example, the user may desire to be interrupted by one or more pre-designated contacts that are identified at an associated electronic device as interrupt-authorized contacts, or by a person who speaks a designated keyword to the user.

20 Claims, 13 Drawing Sheets

(56) References Cited

U.S. PATENT DOCUMENTS

| | | | |
|---|---|---|---|
| 2014/0314242 | A1 | 10/2014 | Gollbach et al. |
| 2015/0279365 | A1* | 10/2015 | Sharifi .................... G10L 15/26 704/235 |
| 2016/0064008 | A1 | 3/2016 | Graham |
| 2017/0345408 | A1 | 11/2017 | Hong et al. |
| 2018/0014107 | A1 | 1/2018 | Razouane et al. |
| 2019/0028803 | A1 | 1/2019 | Benattar |
| 2019/0385590 | A1* | 12/2019 | Omachi ................. H04R 1/406 |
| 2020/0184057 | A1 | 6/2020 | Mukund |
| 2021/0358470 | A1* | 11/2021 | Kemmerer ........... H04R 1/1083 |
| 2021/0405148 | A1* | 12/2021 | Han ........................ G01S 1/805 |

FOREIGN PATENT DOCUMENTS

| | | |
|---|---|---|
| CN | 107430858 A | 12/2017 |
| CN | 108989931 A | 12/2018 |
| CN | 109951765 A | 6/2019 |
| CN | 110191397 A | 8/2019 |
| CN | 110832484 A | 2/2020 |
| GB | 2526980 A | 12/2009 |
| GB | 2522760 A | 8/2015 |
| GB | 2542268 A | 3/2017 |
| WO | WO 2011/161487 | 12/2011 |

OTHER PUBLICATIONS

Li, "Google working on 'attention alerts' for Pixel Buds that detect crying, barking," retrieved from https://9to5google.com/2020/04/29/pixel-buds-attention-alerts/, Apr. 29, 2020, 6 pages.

Guo Yongliang, "Research on an Embedded Speech Command Processing and Recognition Method," Nanjing University of Aeronautics and Astronautics, Thesis, Jan. 2010, 79 pages.

Umematsu et al., "Sudden-noise Suppression with Strike-portion Detection Based on Phase Linearity for Speech Recognition," Jan. 19, 2017, 2016 Asia-Pacific Signal and information Processing Association Annual Summit and Conference.

Zhang Shuai, "Design and Implementation of an Active Noise Deduction Headphone with Large Earmuffs," University of Electronic Science and Technology of China, Thesis, 2018, 76 pages.

Chinese Office Action from Chinese Patent Application No. 202110812663.3, dated Nov. 14, 2023, 25 pages including English language summary.

Chinese Office Action from Chinese Patent Application No. 202110812663.3, dated Mar. 21, 2024, 13 pages including English language summary.

Chinese Office Action from Chinese Patent Application No. 202110812663.3, dated May 27, 2024, 12 pages including English language summary.

* cited by examiner

… (1)

INTERRUPT FOR NOISE-CANCELLING AUDIO DEVICES

CROSS REFERENCE TO RELATED APPLICATIONS

This application claims the benefit of priority to U.S. Provisional Patent Application No. 63/053,459, entitled "Interrupt For Noise-Cancelling Audio Devices," filed on Jul. 17, 2020 and U.S. Provisional Patent Application No. 63/055,269, entitled "Interrupt For Noise-Cancelling Audio Devices," filed on Jul. 22, 2020, the disclosure of each which is hereby incorporated herein in its entirety.

TECHNICAL FIELD

The present description relates generally to media output devices and, more particularly, for example, to operations for interrupting noise-cancelling audio devices.

BACKGROUND

Audio devices such as headphones and earbuds can include noise-cancelling features in which sounds generated externally to the audio device are detected and cancelled by the audio device. In this way, a wearer of the audio device can be provided with reduced-noise environment and/or an enhanced listening environment for audio content generated by the audio device. These noise-cancelling features of audio devices prevent the user from hearing undesirable external noise, but they can also prevent the wearer from hearing external sounds that the wearer may desire to hear.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
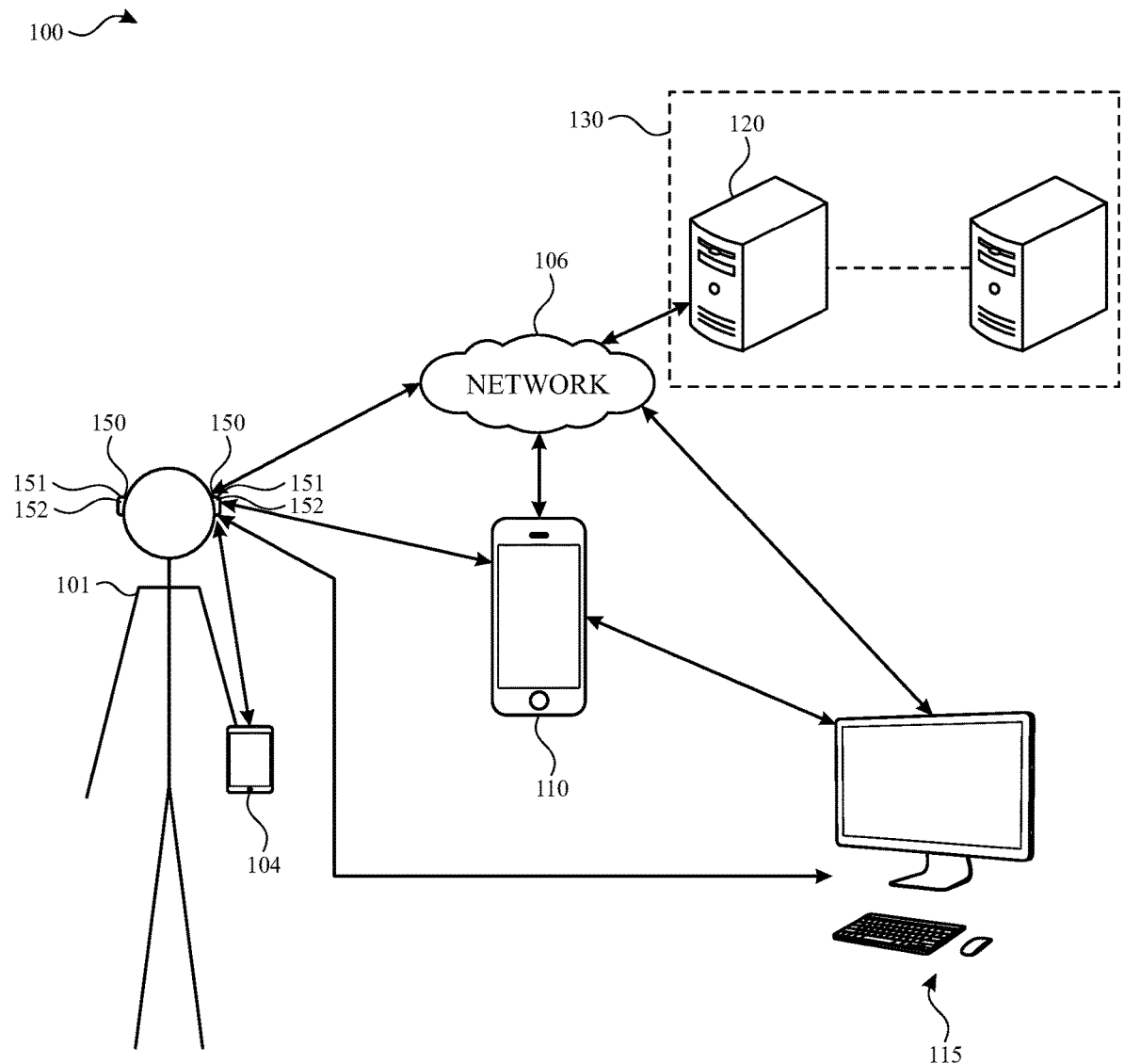
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Implementations of the subject technology described herein provide an automatic trigger to switch an audio device such as headphones or earbuds from a noise-cancelling mode of operation (e.g., in which noise cancelling content is generated based on sounds received at a microphone to cancel the received sounds and thereby reduce or prevent the received sounds from reaching the ear(s) of a user/wearer of the audio device) to another mode of operation (e.g., an acoustically transparent mode of operation in which noises and/or sounds generated externally to the audio device are passed through to the ear(s) of the user/wearer), responsive to an audio interruption from an external voice.

The external voice may be a voice of a known contact that has been identified, at another device associated with the audio device and the user (e.g., a phone, tablet, or other device of the same user of the audio device), as an interruption-authorized contact. In one or more implementations, an interruption-authorized contact may not be an authorized user of either the headphones or the associated device.

In contrast with existing systems and methods for ending a noise-cancelling mode of operation based on a sound, the disclosed systems and methods provide, alone and/or in various combinations, (i) identification of one or more contacts at one device of a user (e.g., the phone/tablet/etc. of the user) as interrupt-authorized contacts for a peripheral device (e.g., the audio device or another media output device) of the same user, (ii) performing at least a first level of identification (e.g., of a spoken name of the user, or of the contact as one of several interrupt-authorized contacts) of the voice at the audio device (e.g., using a machine-learning (ML) model), (iii) performing a second level of identification of the voice (e.g., as a specific interrupt-authorized contact) at the associated device (e.g., using a more accurate model at the associated device), and (iv) identifying the interrupt-authorized contact using a model at the audio device that has been trained at another device of the user (e.g., the user's phone or another device of the user and synchronized to the phone).

Additional aspects of the subject disclosure include creating an interrupt-authorized contact on the fly (e.g., while the user is wearing the headphones and has switched to transparency mode, or using voice information received during a phone call with the contact if consent has been granted by the person providing the voice information), and/or using additional features of the headphones, the voice, a device of the person corresponding to the voice, etc. to avoid false positives (e.g., using recency or frequency heuristics for an identified contact, and/or a proximity or location of the voice, such as determined using volume information or time-of-arrival difference information as gathered by the headphones).

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes a media output device 150, an electronic device 104 (e.g., a handheld electronic device such as a smartphone or a tablet), an electronic device 110, an electronic device 115, and a server 120 communicatively coupled by a network 106 (e.g., a local or wide area network). For explanatory purposes, the system architecture 100 is illustrated in FIG. 1 as including the media output device 150, the electronic device 104, the electronic device 110, the electronic device 115, and the server 120; however, the system architecture 100 may include any number of electronic and/or audio devices and any number of servers or a data center including multiple servers.

The media output device 150 may be implemented as an audio device such as a smart speaker, headphones (e.g., a pair of speakers mounted in speaker housings that are coupled together by a headband), or an earbud (e.g., an earbud of a pair of earbuds each having a speaker disposed in a housing that conforms to a portion of the user's ear) configured to be worn by a user (also referred to as a wearer when the audio device is worn by the user), or may be implemented as any other device capable of outputting audio, video and/or other types of media (e.g., and configured to be worn by a user). Each media output device 150 may include one or more speakers such as speaker 151 configured to project sound into an ear of the user 101, and one or more microphones such as microphone 152 configured to receive external noise input and/or external voice inputs. In one or more implementations, the media output device 150 may include display components for displaying video or other media to a user. Although not visible in FIG. 1 (see, e.g., FIG. 2), each media output may include processing circuitry (e.g., including memory and/or one or more processors) and communications circuitry (e.g., one or more antennas, etc.) for receiving and/or processing audio content from one or of the electronic device 104, the electronic device 110, the electronic device 115, and/or the server 120. The processing circuitry of the media output device or another device may operate the speaker 151 to generate the sound. The memory may store one or more machine learning models for determining when an external voice is authorized to interrupt the user 101, while the media output device is in a noise-cancelling mode of operation.

The media output device may include communications circuitry for communications (e.g., directly or via network 106) with the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The electronic device 104, the electronic device 110, an electronic device 115, and/or the server 120 may include communications circuitry for communications (e.g., directly or via network 106) with media output device 150 and/or with the others of the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios.

In one or more implementations, the media output device 150 may also include one or more machine learning models that are trained to recognize the voice of user 101, any of various verbal commands from the voice of user 101, and/or any of various standardized sounds such as police or ambulance sirens, or smoke or fire alarms. However, the operations of recognizing the user's own voice and/or standardized sounds are distinct from the operations of recognizing an interrupt-authorized user, particularly because of the relatively smaller amount of time and/or data available for training models (e.g., as compared to the availability of the user's own voice), and/or because of the wide variety of voices of other people that each may or may not be known to the user.

The media output device 150 may be communicatively coupled to a base device such as the electronic device 104, the electronic device 110 and/or the electronic device 115. Such a base device may, in general, include more computing resources and/or available power in comparison with the media output device 150. In an example, media output device 150 may operate in various modes. For instance, the media output device 150 can operate in a first mode of operation (e.g., a transparent mode of operation) in which audio content (e.g., from electronic device 104) is played without noise-cancelling content (e.g., to allow and/or enhance external sounds for pass-through to the user while the audio content plays) or in a second mode of operation (e.g., a noise-cancelling mode of operation) in which the audio content is played combined with noise cancelling content by the media output device. The memory of media output device 150 may store one or more machine learning models (referred to herein as acoustic models) for determining when an external voice is authorized to interrupt the user 101 while the media output device is in a noise-cancelling mode of operation.

Media output device 150 may also include one or more sensors such as touch sensors and/or force sensors for receiving user input. For example, a user/wearer of media output device 150 may tap a touch sensor or pinch the force sensor briefly to control the audio content being played, to control volume of the playback, and/or to toggle between the transparent and noise-cancelling modes of operation. In one or more implementations, the user may hold down the force sensor while the media output device is operated in the noise-cancelling mode of operation to temporarily switch to the transparent mode of operation until the force sensor is released.

The electronic device 104 may be, for example, a smartphone, a portable computing device such as a laptop computer, a peripheral device (e.g., a digital camera, headphones, another audio device, or another media output device), a tablet device, a wearable device such as a smart watch, a smart band, and the like, any other appropriate device that includes, for example, processing circuitry and/or communications circuitry for providing audio content to media output device(s) 150. In FIG. 1, by way of example, the electronic device 104 is depicted as a mobile smartphone device with a touchscreen. In one or more implementations, the electronic device 104 and/or the media output device 150 may be, and/or may include all or part of, the electronic device discussed below with respect to the electronic system discussed below with respect to FIG. 14.

The electronic device 115 may be, for example, desktop computer, a portable computing device such as a laptop computer, a smartphone, a peripheral device (e.g., a digital camera, headphones, another audio device, or another media output device), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 14.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server.

Figure 2:
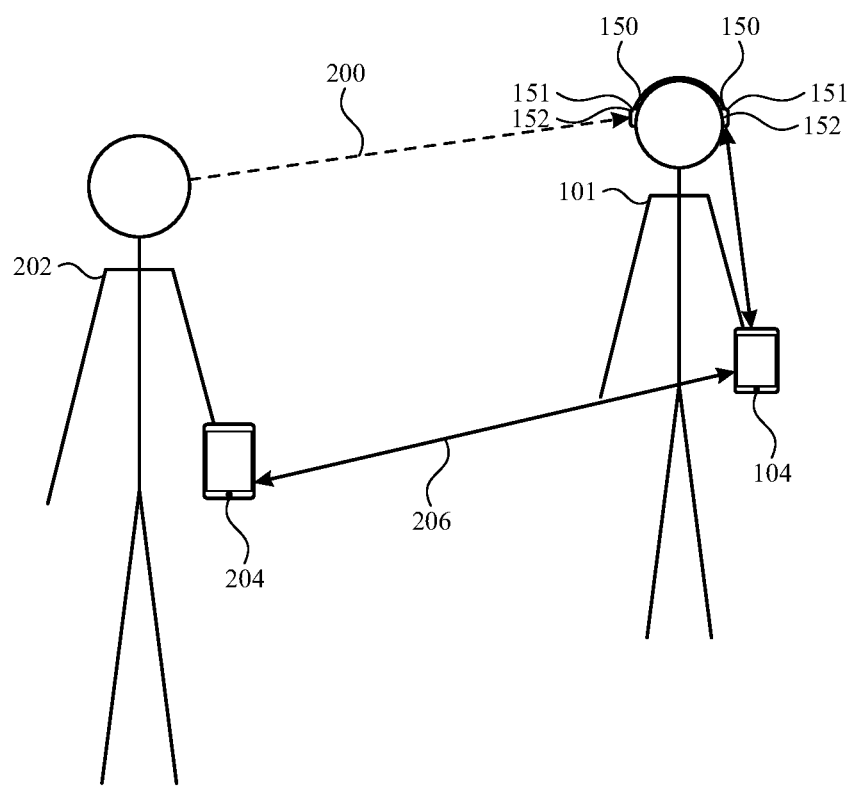
FIG. 2 illustrates an example of an environment that includes a media output device receiving an external voice input in accordance with implementations of the subject technology.

FIG. 2 illustrates an environment in which a user 101 is wearing media output devices 150. Media output device 150 may be playing audio content, from electronic device 104, using speaker(s) 151, such as in a noise-cancelling mode of operation in which the media output device 150 plays the audio content combined with noise cancelling content generated using external noise input captured using microphone (s) 152.

In the example of FIG. 2, a voice input 200 from a person 202 (e.g., a speaker) other than the user 101 of the media output device 150 is received by a microphone 152 of the media output device 150 (e.g., when the person 202 speaks to the user 101 while the media output device is in the noise-cancelling mode of operation). As discussed in further detail hereinafter, media output device 150 and/or electronic device 104 may determine, based on the voice input 200, whether the person 202 is authorized to interrupt the user 101 (e.g., to interrupt the noise-cancelling mode of operation of the media output device 150 by causing the media output device 150 to switch from the noise-cancelling mode of operation to a transparent mode of operation).

As shown in FIG. 2, the person 202 can, optionally, have an electronic device 204 that exchanges communications 206 with the user's device 104. For example, communications 206 may include proximity information between the two devices (e.g., based on NFC and/or wireless communication between the devices), contact information, voice profile information, requests for consent for accessing and/or generating voice profile information, messaging communications, voice call communications, and/or other communications. In one or more implementations, communications 206 can be used for additional verification of whether the person 202 is authorized to interrupt the user 101 (e.g., to interrupt the noise-cancelling mode of operation of the media output device 150).

Figure 3:
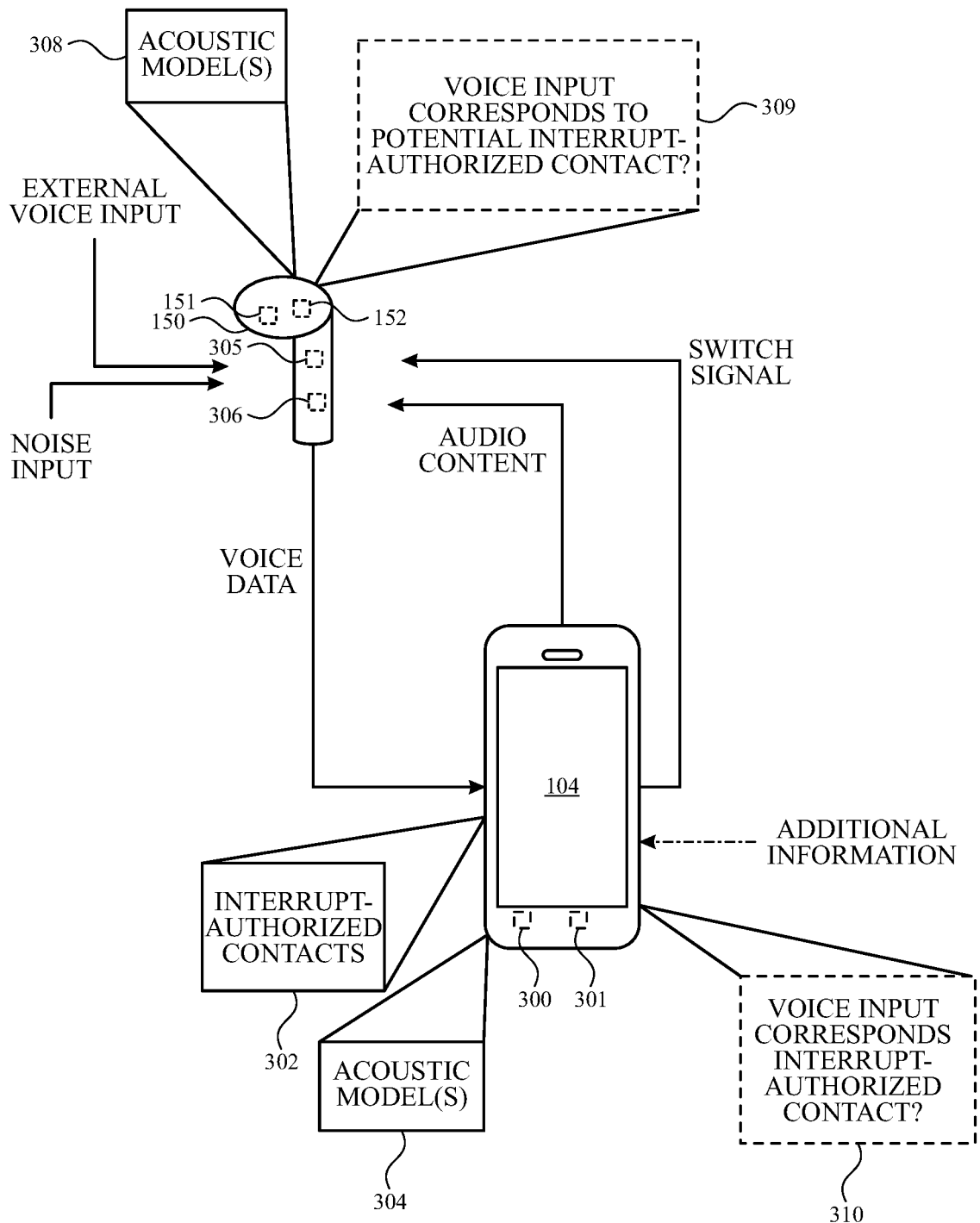
FIG. 3 illustrates a schematic diagram illustrating a media output device in communication with another electronic device in accordance with implementations of the subject technology.

FIG. 3 is a schematic diagram that illustrates various information and/or operations that can be utilized by electronic device 104 and/or media output device 150 to determine whether the person 202 is an interrupt-authorized contact of user 101 that can cause the media output device 150 to switch from a noise-cancelling mode of operation to a transparent mode of operation to interrupt the user.

As illustrated in FIG. 3, a device (e.g., electronic device 104) of a first user (e.g., user 101) may include secure memory 300 storing a plurality of contacts including contacts designated at the device as interrupt-authorized contacts 302 for a peripheral device such as media output device 150. As shown in FIG. 3, the electronic device may also include one or more processors 301 that can provide audio content to the media output device 150. The audio content can be played by the media output device 150 in a first mode of operation of the media output device 150 or can be played combined with noise cancelling content by the media output device 150 in a second mode of operation of the peripheral device. The noise cancelling content may be generated by the media output device 150 based on noise input received at the microphone 152 of the media output device 150, as indicated in FIG. 3.

As illustrated in FIG. 3, media output device 150 may include a speaker 151, a microphone 152, secure memory 305, and processing circuitry 306. The processing circuitry may operate the speaker 151 to play the audio content received from the first device of the first user in the first mode of operation, and/or operate the speaker 151 to play the audio content combined with noise cancelling content generated using the microphone 152 (e.g., based on the noise input and using the processing circuitry 306) in a second mode of operation (e.g., the noise-cancelling mode of operation).

In one or more implementations, electronic device 104 may receive, from the media output device 150, information associated with a voice input (e.g., the external voice input shown in FIG. 3) received by the media output device 150 from a person (e.g., person 202) other than the first user (e.g., user 101) during operation of the peripheral device in the second mode of operation. The information may include voice data such as the external voice input itself, a voice profile extracted from the external voice input (e.g., by processing circuitry 306), and/or an indication that the person is a potential interrupt-authorized user (e.g., based on an output from an acoustic model 308 stored in secure memory 305 at the media output device 150, the output indicating that the external voice input likely belongs to one of the interrupt-authorized contacts 302).

It is contemplated that the receipt of voice profile, voice data, or any other data at electronic device 104 will only occur after receiving consent of the other person as specified in applicable law. For example, the other person will receive a message indicating that they can select whether to "opt in" to sending voice data to another device.

For example, the processing circuitry 306 may execute one or more of the acoustic models 308 at the peripheral device (e.g., in an operation 309), to determine whether the voice input corresponds to a potential user authorized contact. Electronic device 104 may determine, at least in part based on the information received from the peripheral device (e.g., using one or more acoustic models 304 stored in the secure memory 300 of the electronic device 104), whether the person (e.g., the person identified at the media output device 150 as a potential interrupt-authorized contact) is one of the interrupt-authorized contacts 302 (e.g., in an operation 310). It should be appreciated that contact information, voice profile information, and/or acoustic models such as acoustic models 304 and 308 can be stored in secure memory 300 or 304 by storing the contact information, the voice profile, and/or the acoustic model in encrypted form in a main (e.g., unencrypted) memory of the device, and storing a key for decrypting the encrypted contact information, the voice profile, and/or the acoustic model in the secure memory 300 or 304 of the device. In this way, the secure element of the memory at one or both devices can be provided with a small amount of on-chip memory. It should be understood that the voice data that is received should be no more than is needed to determine whether the person is one of the interrupt-authorized contacts 302.

Electronic device 104 may transmit an instruction (e.g., a switch signal in the example of FIG. 3) to the media output device 150 to switch from the second mode of operation to the first mode of operation if it is determined that the person is one of the interrupt-authorized contacts 302. Electronic device 104 may transmit an instruction to the media output device 150 to continue operation in the second mode of operation if it is determined (e.g., in the operation 310) that the person 202 is not one of the interrupt-authorized contacts 302.

In one or more implementations, the interrupt-authorized contacts 302 are not authorized users of the device or the peripheral device. In one or more implementations, determining that the person 202 is one of the interrupt-authorized contacts does not provide access, by the person 202, to any content at or from the electronic device 104 or the media output device 150.

In one or more implementations, an acoustic model 308 at the media output device 150 is a first acoustic model, and the one or more processors 301 of electronic device 104 are configured to determine whether the person 202 is one of the interrupt-authorized contacts 302 by determining, with a second acoustic model (e.g., one of acoustic models 304) at the device, whether a voice profile extracted from the voice input corresponds to one or more voice profiles associated with the interrupt-authorized contacts 302. In one or more implementations, voice profiles for the interrupt-authorized contacts 302 may have been received at the electronic device 104 from a second device, such as electronic device 204 of the person 202, or from a remote server such as server 120.

In one or more implementations, the acoustic models 304 at the electronic device 104, and the acoustic models 308 at the media output device 150, are trained at the electronic device 104. For example, one or more of the acoustic models 304 and/or one or more of the acoustic models 308 may be trained, at the electronic device 104, using the one or more voice profiles. In one or more implementations, one or more of the acoustic models 308 at the media output device 150 may have been trained, at the electronic device 104, using a training voice input that includes a designated keyword such as at least portion of a name of the first user. For example, based on a training operation in which the user 101 states their own name in their own voice, one or more of the acoustic models 308 may be trained to recognize the name of the user 101 when spoken by a different voice.

As indicated in FIG. 3, electronic device 104 may also receive additional information such as information from the electronic device 204 of the person 202. For example, the additional information may include proximity information for the electronic device 204, contact information for the person 202 (e.g., the user of electronic device 204), and/or other information from the electronic device 204. In one or more implementations, the one or more processors of electronic device 104 may determine whether the voice profile extracted from the voice input corresponds to one or more voice profiles associated the interrupt-authorized contacts 302, in part, based the additional information (e.g., based on communication between the device and a second electronic device 204 of the person 202).

In one or more implementations, electronic device 104 may use other information stored in secure memory 300 to determine and/or verify whether the voice profile extracted from the voice input corresponds to one or more voice profiles associated the interrupt-authorized contacts 302. For example, the one or more processors 301 may determine whether the voice profile extracted from the voice input corresponds to one or more voice profiles associated the interrupt-authorized contacts, in part (e.g., by weighting the determination or separately verifying the determination), based on recency information (e.g., how recent the last call or the last message to or from the person 202 was exchanged) or frequency information for the plurality of contacts stored at the device (e.g., how frequently calls and/or messages to or from the person 202 are exchanged).

In one or more implementations, while operating the speaker 151 in the second mode of operation, media output device 150 may receive a voice input, with the microphone 152, from a person (e.g., person 202) other than the first user (e.g., user 101). Media output device 150 (e.g., processing circuitry 306) may determine, at least in part using an acoustic model 308 stored in secure memory 305 at the media output device 150, whether the person has been designated, at the electronic device 104, as an interrupt-authorized contact 302. Media output device 150 may then switch the operation of the speaker 151 to the first (e.g., transparent) mode of operation if it is determined that the person 202 is the interrupt-authorized contact 302 and/or continue operation of the speaker 151 in the second mode of operation (e.g., the noise-cancelling mode of operation) if it is determined that the person 202 is not the interrupt-authorized contact 302.

In one or more implementations, the acoustic models 308 at the media output device 150 include a first acoustic model, and the processing circuitry 306 of the media output device 150 determines, at least in part using the acoustic model 308 at the peripheral device, whether the person 202 has been designated, at the electronic device 104, as the interrupt-authorized contact 302 by determining, using the first acoustic model of the acoustic models 308, that the person 202 is a potential interrupt-authorized contact (e.g., in an operation 309). The processing circuitry 306 of the media output device 150 may then provide information (e.g., the voice data as shown in FIG. 3) associated with the voice input to electronic device 104, responsive to determining that the person is the potential interrupt-authorized contact. The processing circuitry 306 of the media output device 150 may then receive, from the electronic device 104, and responsive to providing the information, an instruction (e.g., the switch signal as shown in FIG. 3) to switch the operation of the speaker 151 to the first mode of operation.

In one or more implementations, the instruction (e.g., the switch signal) from the electronic device 104 is based on a comparison, at the electronic device 104, of the information associated with the voice input to at least one voice profile associated with at least one contact that is identified, in secure memory 300 at the electronic device 104, as being interrupt authorized, and based on a determination, at the electronic device 104, of whether the person 202 is the interrupt-authorized contact 302 based on the comparison.

In one or more implementations, the comparison, at the electronic device 104, of the information associated with the voice input to at least one voice profile accessible by electronic device 104 is based on an output of a second acoustic model (e.g., one of acoustic models 304) at the electronic device 104. The comparison may be performed responsive to the information (e.g., the voice data) associated with the voice input. The second acoustic model may have been trained, at the electronic device 104, using the at least one voice profile (e.g., a voice profile of the person 202 that, based on consent from the person 202, is stored in secure memory 300 in connection with contact information for the person 202 and/or is accessible by electronic device 104 from server 120).

In one or more implementations, processing circuitry 306 determines, using the first acoustic model (e.g., one of acoustic models 308), that the person 202 is the potential interrupt-authorized contact (e.g., in operation 309) by determining, using the first acoustic model, that the voice input includes at least portion of a name of the first user (e.g., when the person 202 speaks the name of user 101, thereby indicating that they are familiar with user 101). In one or more implementations, the processing circuitry 306 determines, using the first acoustic model, that the person is a potential interrupt-authorized contact (e.g., in operation 309) by determining, using the first acoustic model, that the voice input corresponds to one of a group of interrupt-authorized contacts (e.g., using a low accuracy one of acoustic models 308 that has been trained using the voice profiles of a group of the interrupt-authorized contacts).

In one or more implementations, the processing circuitry 306 determines, in part using the acoustic model 308 at the media output device 150 and in part based on information received from the first device (e.g., electronic device 104), whether the person 202 has been designated, at the electronic device 104, as the interrupt-authorized contact 302. The information from the electronic device 104 may be based, in part, on recency information or frequency information for contacts stored at the first device.

In one or more implementations, the processing circuitry 306 determines, in part using the acoustic model 308 at the media output device 150 and in part based on information received from the first device, whether the person 202 has been designated, at the electronic device 104, as the interrupt-authorized contact 302. The information may be based, in part, on communication between the first device and a second device such as electronic device 204 of the person 202 (e.g., proximity information and/or contact information based on communication with the electronic device 204).

Acoustic models 304 and/or 308 each be implemented as machine learning models that are trained to identify, based on an external voice input from a person other than the user of the media output device 150 and the electronic device 104, and or all of (i) a designated keyword in the external voice input, (ii) a potential interrupt-authorized contact corresponding to the external voice input, and/or (iii) an interrupt-authorized contact, as described herein.

In one or more implementations, the processing circuitry 306 determines, at least in part using the acoustic model 308 at the media output device 150, whether the person 202 has been designated, at the first device, as the interrupt-authorized contact 302 using the acoustic model 308 and additional information associated with the received voice input. For example, the additional information may include location information associated with the voice input, the location information having been determined using the microphone 152 and an additional microphone 152 of an additional media output device (e.g., the other earbud of a pair of earbuds) of the first user, the additional peripheral device further including an additional speaker 151.

Figure 4:
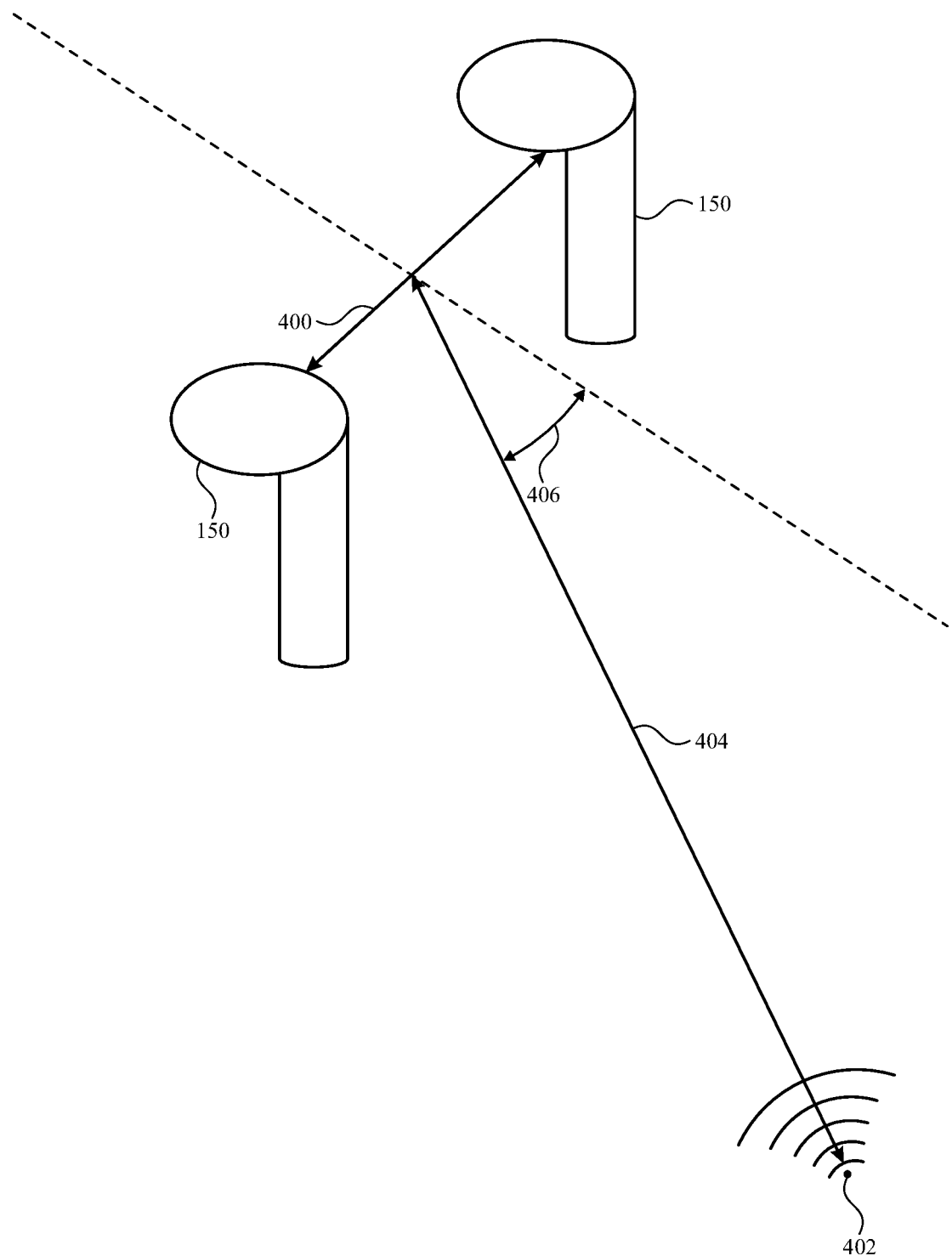
FIG. 4 illustrates audio devices capable of determining location information for a source of external sound in accordance with one or more implementations of the subject technology.

FIG. 4 illustrates an example in which two media output devices 150 (e.g., a pair of earbuds) are separated by a distance 400 (e.g., the width of the user's head) that can be known or estimated. As shown, the two media output devices 150 can determine the distance 404 (e.g., proximity information such as a distance) and/or the angular position 406 (e.g., directional information) for the source 402 of the external voice input (e.g., corresponding to the location of the person 202) relative to the locations of the media output devices. For example, the processing circuitry 306 may increase the ability of the person 202 to interrupt the user when the person 202 is determined to be located nearby the user 101 (e.g., at a distance of less than a distance threshold such as one meter, to avoid interrupting the user when the person 202 is far away or talking but to another person) and/or at an angular position 406 that is behind the user 101 (e.g., to aid the user's awareness of their environment when the person 202 is not in the user's visual field of view).

Figure 5:
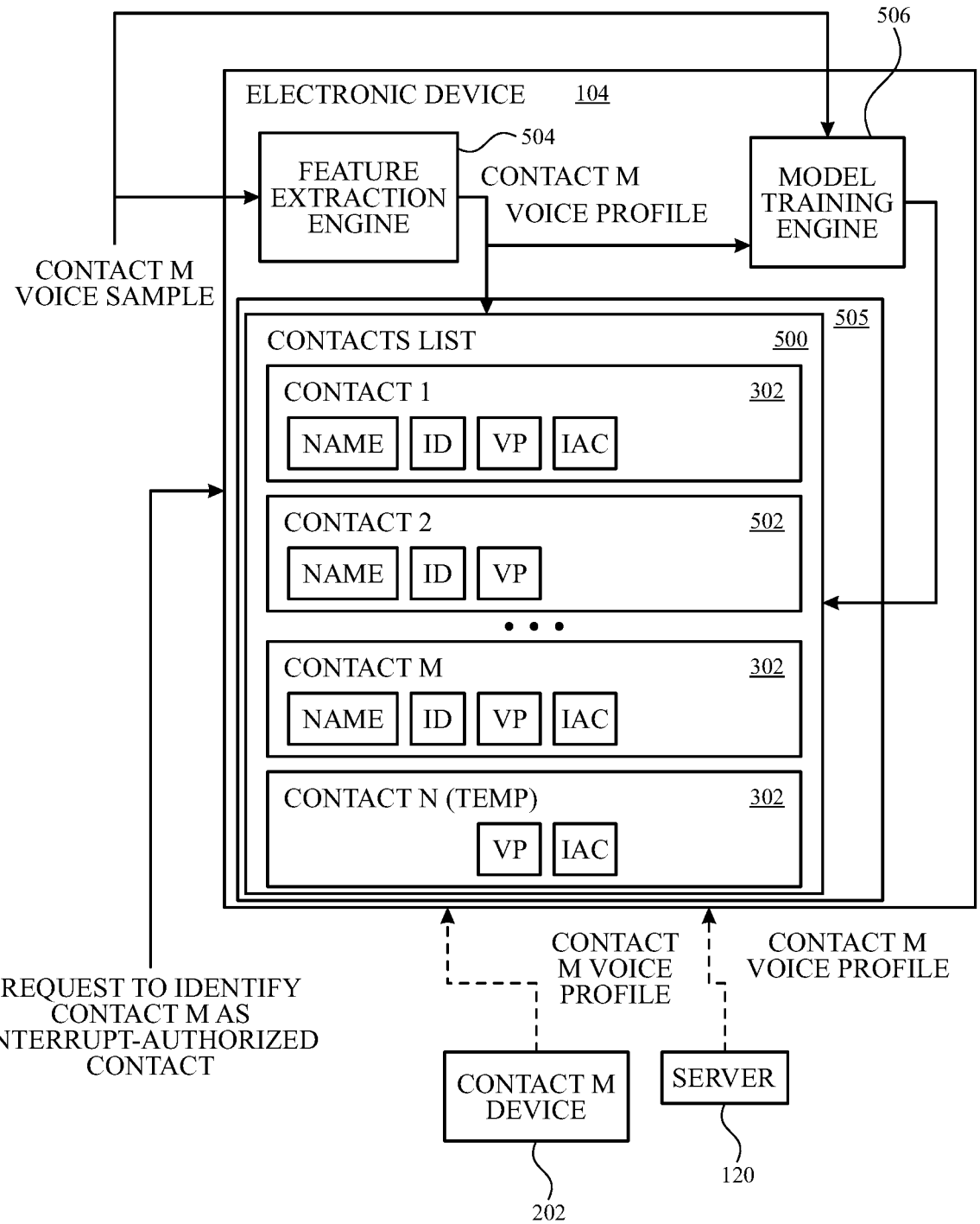
FIG. 5 illustrates schematic diagram of an electronic device storing contacts including contacts designated as interrupt-authorized contacts in accordance with implementations of the subject technology.

FIG. 5 illustrates various aspects of how interrupt-authorized contacts 302 may be designated and/or stored by electronic device 104. As indicated in FIG. 5, a device such as electronic device 104 of a user such as user 101 may include memory 505 (e.g., including secure memory 300) and one or more processors (e.g., including the one or more processors 302 as shown in FIG. 3). In one or more implementations, the one or more processors may store, in the memory 505 at the device, one or more interrupt-authorized contacts 302 having one or more respective voice profiles (VP). The memory 505 may store a contacts list 500 that includes contacts 502 that are not interrupt-authorized contacts, and the contacts that have been designated as interrupt-authorized contacts 302 (e.g., designated responsive to a request from the user 101 of electronic device 104 and by storing an interrupt-authorized contact indicator (IAC) for those interrupt-authorized contacts 302). As shown in FIG. 5, the contacts 502 and the interrupt-authorized contacts 302 in contacts list 500 may include additional information for those contacts, such as a name of each contact and/or an identifier (ID) such as a phone number or an email address for that contact.

As described herein, electronic device 104 may provide audio content to an media output device 150 of the user 101, the media output device 150 being configured to play the audio content in a first mode of operation and to play the audio content combined with noise-cancelling content generated using a microphone 152 in a second mode of operation. Electronic device 104 may receive, from the media output device 150 for the user 101, information associated with a voice input (e.g., the external voice input of FIG. 3)

received at the media output device 150 from a person (e.g., person 202) other than the user 101, while the media output device 150 is operated in the second mode of operation. The electronic device 104 may determine, by providing the information associated with the voice input to an acoustic model 304 trained (e.g., using a model training engine 506) using the one or more respective voice profiles (VP), whether the person 202 is one of the one or more interrupt-authorized contacts 302. The electronic device 104 may then instruct the media output device 150 to switch from the second mode of operation to the first mode of operation if it is determined that the person 202 is one of the one or more interrupt-authorized contacts 302.

As shown in FIG. 5, the one or more processors 301 of electronic device 104 may store, in the memory 505, a full list (e.g., contacts list 500) of contacts. The electronic device 104 may then receive a user request to designate one or more of the contacts in the full list of contacts as the one or more interrupt-authorized contacts 302 for the media output device 150 (e.g., a request to identify contact M as an interrupt-authorized contact, in the example of FIG. 5). The electronic device 104 may then store, in the memory 505, the one or more interrupt-authorized contacts 302 by designating (e.g., by storing an interrupt-authorized contact indicator (IAC)) the one or more of the contacts as the one or more interrupt-authorized contacts 302 responsive to the user request.

As shown in FIG. 5, in one or more implementations, the one or more processors 301 of electronic device 104 may obtain access to the one or more respective voice profiles (VP) of the one or more interrupt-authorized contacts 302 from a remote server such as server 120 or from one or more respective devices of the one or more interrupt-authorized contacts (e.g., from electronic device 204 of person 202, such as from a device of contact M in the example of FIG. 5). For example, the electronic device 104 may obtain the access to the one or more respective voice profiles (VP) of the one or more interrupt-authorized contacts from the remote server such as server 120, or from the one or more respective devices of the one or more interrupt-authorized contacts (e.g., from electronic device 204 of person 202, such as from a device of contact M in the example of FIG. 5), responsive to a request from at least one of the one or more respective devices to share the at least one of the one or more respective voice profiles (e.g., based on a request from contact M to share their own voice profile VP with the electronic device 104).

As illustrated in FIG. 5, in one or more implementations, the one or more processors 301 of electronic device 104 may also, or alternatively, generate at least one of the one or more respective voice profiles (VP) by obtaining a voice sample (e.g., a contact M voice sample in the example of FIG. 5) from at least one of the one or more contacts. For example, electronic device 104 may transmit a request to the person 202 for consent to obtain the voice sample on the device, receive consent from the person 202 to obtain the voice sample on the device, and obtain the voice sample, responsive to receiving the consent from the person 202 to obtain the voice sample, using a microphone of the electronic device 104 or the microphone 152 of the media output device 150.

In one or more implementations, electronic device 104 may obtain the voice sample, using a microphone of the device or a microphone 152 of the media output device 150, responsive to a user input to the media output device 150 requesting a temporary switch to the first mode of operation from the second mode of operation. For example, if a user 101 would like the voice of a flight attendant to be recognized as the voice of an interrupt-authorized user while the user is on a flight with consent from the flight attendant, and even though the flight attendant is not a contact of the user, the media output device 150 (and/or electronic device 104) can obtain a voice profile of the flight attendant (e.g., while a force input is applied to a force sensor of the media output device to temporarily switch to a transparent mode while the flight attendant is speaking to the user or making flight announcements) and generate (e.g., using feature extraction engine 504) and temporarily store the voice profile VP for the flight attendant. In such cases, it is contemplated that no other identifiable information will be collected and stored by the electronic device relating to the third party (e.g., the flight attendant) other than the voice sample and one or more generated voice profiles. In addition, the electronic device will delete the voice sample and the one or more generated voice profiles after a predetermined period of time. For example, the voice sample may be deleted immediately after generating the voice profile. As another example, the voice profile may be deleted after an event is determined to be over (e.g., the user has exited the flight).

In one or more implementations, after receiving consent from another person to provide the voice sample over a voice call or video call between the device and a second device of the person, electronic device 104 may obtain the voice sample. In addition, as described above, unless consent is obtained from the other person, the electronic device will delete the voice sample and the one or more generated voice profiles after a predetermined period of time.

As shown in FIG. 5, in one or more implementations, electronic device 104 may then train the acoustic model(s) 304 and/or 308, using the respective one or more voice profiles (VP), to identify the one of the one or more interrupt-authorized contacts 302.

In some examples, a device such as electronic device 104 includes one or more processors configured to receive a request (e.g., a user request from a user of the device, such as user 101) to designate a voice profile as an interrupt-authorized voice profile for a media output device (e.g., a media output device 150) associated with the device. The device may provide, to a second device (e.g., a device 204 of a user other than the user of the device, such as person 202), a request for the voice profile. The device may receive, responsive to the request for the voice profile and responsive to consent from a person (e.g., person 202) corresponding to the voice profile, the voice profile from the second device. The device may train (e.g., using model training engine 506) an acoustic model, using the voice profile, to determine whether to interrupt media content output from the media output device (e.g., while the media output device is operating in a noise-cancelling mode of operation) responsive to an external voice input. In one or more implementations, the device may securely store the voice profile at the device in connection with a contact stored at the device for the person. In one or more implementations, the device may provide the trained acoustic model to the media output device (e.g., for use in identifying interrupt-authorized voice profiles and/or interrupt-authorized contacts) at the media output device. In one or more implementations, the device may receive voice information (e.g., the external voice input or a voice profile extracted from the external voice input) associated with the external voice input from the media output device. The device may execute the trained acoustic model to determine whether to interrupt the media content output from the media output device responsive to the voice information.

The device may provide an instruction to the media output device based on the determination.

In some examples, a device such as electronic device 204 may receive, from a second device (e.g., from electronic device 104), a request for a voice profile of a user of the device, for use in designating the voice profile as an interrupt-authorized voice profile for a media output device (e.g., media output device 150) associated with the second device. In one or more implementations, the device (e.g., electronic device 204) may provide, to the user, a request for consent to share the voice profile with the second device. The device may receive the consent from the user, and provide, responsive to receiving the consent, the voice profile to the second device. In these examples, the second device (e.g., electronic device 104) may train an acoustic model (e.g., using model training engine 506), using the voice profile, to determine whether to interrupt media content output from the media output device responsive to an external voice input to the media output device. The device (e.g., electronic device 204) may have the voice profile stored prior to receiving the request from the second device (e.g., electronic device 104), or may generate the voice profile responsive to the request and to receiving the consent. For example, prior to providing the voice profile to the second device (e.g., electronic device 104 in this example), the device (e.g., electronic device 204 in this example) may obtain a sample voice input from the user; and generate the voice profile from the sample voice input.

FIGS. 6 and 7, 8 and 9, and 10 and 11, respectively illustrate how various acoustic models that reside at an media output device 150 and/or at a an associated electronic device (e.g., a smartphone, a tablet, a laptop, a desktop computer, a smart watch, or the like) for the media output device can include acoustic models for detecting a designated keyword (e.g., a name, or a variant thereof such as a nickname) of the user/wearer/owner of the media output device and the associated electronic device) in an external voice input, for detecting whether the speaker of the external voice input is a potential interrupt-authorized contact (e.g., whether the speaker is any of a group of interrupt-authorized contacts), and/or for determining whether the external voice input corresponds to a specific interrupt-authorized user.

Figure 6:
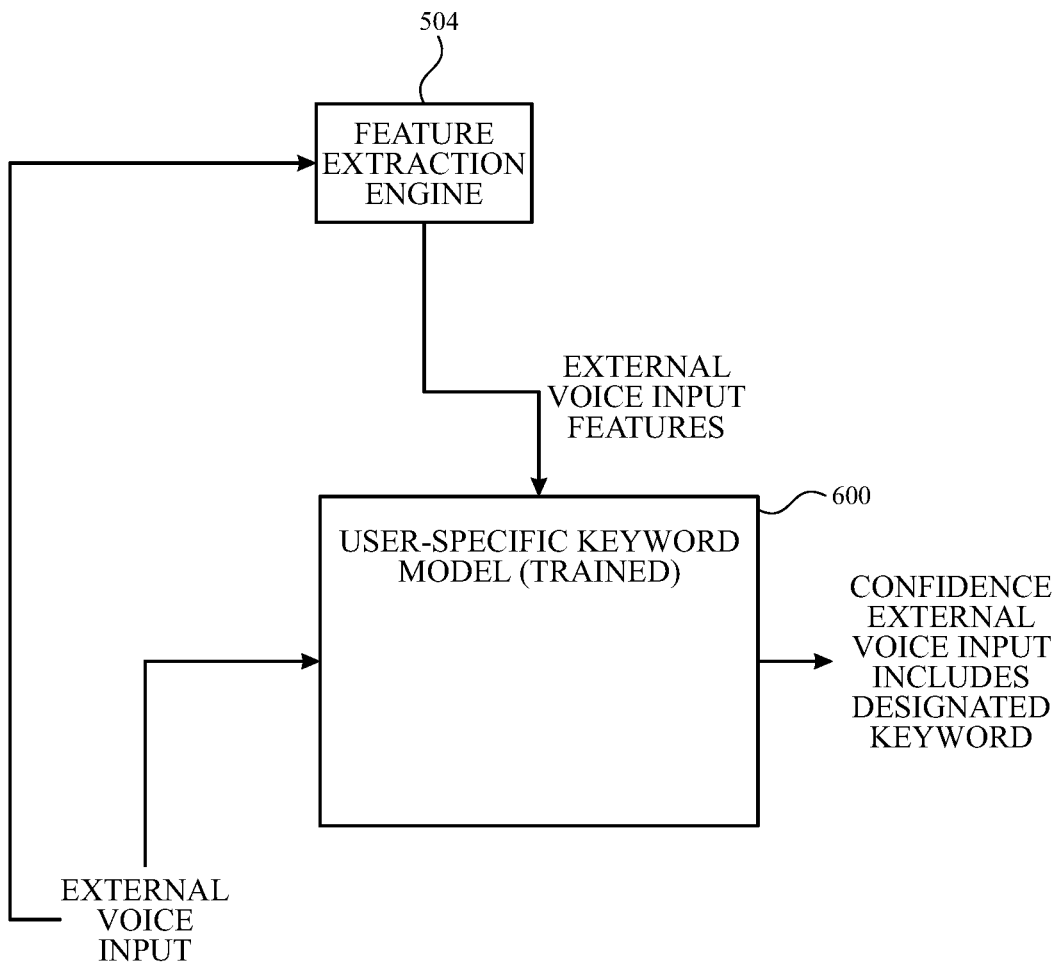
FIG. 6 illustrates a schematic flow diagram for identifying a designated keyword using an acoustic model in accordance with implementations of the subject technology.

In the example of FIG. 6, an external voice input can be received at the media output device. The external voice input may include one or more words spoken by a person 202 to a user 101 that is wearing an media output device 150. In various implementations, the media output device 150, or an associated electronic device such as electronic device 104 can include a trained acoustic model implemented as a trained user-specific keyword model 600. As shown, the user-specific keyword model 600 may be trained to output a confidence (e.g., a confidence score, a confidence percentage, or another confidence value) or other indicator of whether the external voice input includes a designated keyword. In one or more implementations, the designated keyword may include a first and/or last name of the user 101, a variant (e.g., a truncation or modification) of the first name or the last name of the user, a nickname of the user 101, and/or any other designated keyword associated with the user 101 of media output device 150 and electronic device 110. As shown in FIG. 6, in various implementations, the user-specific keyword model 600 may be trained to recognize a designated keyword based on an external voice input itself, or based on external voice input features extracted from the external voice input by the feature extraction engine 504.

Figure 7:
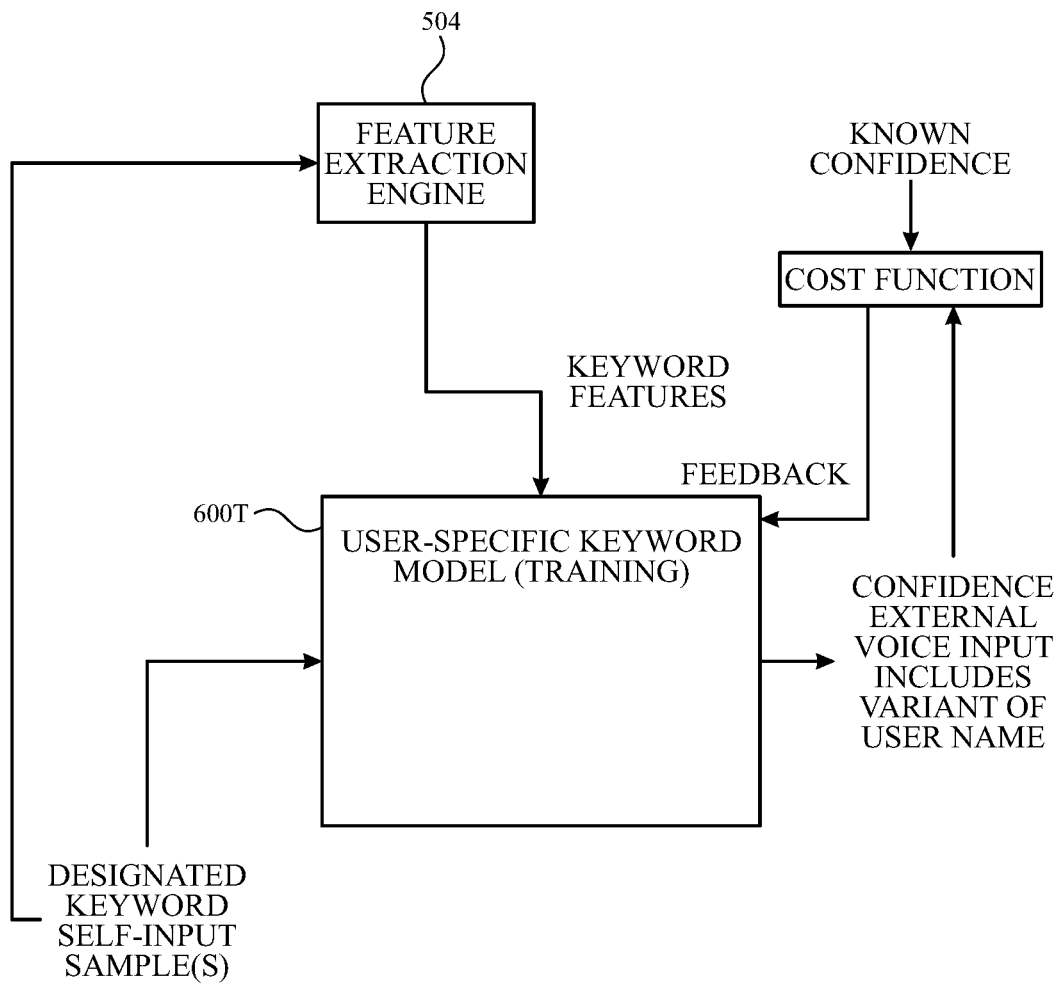
FIG. 7 illustrates schematic flow diagram for training an acoustic model to recognize a potential interrupt-authorized contact in accordance with implementations of the subject technology.

FIG. 7 illustrates a training operation for training the user-specific keyword model 600 to recognize a designated keyword (e.g., the user's name or a variant thereof) in accordance with one or more implementations. As shown in FIG. 7, user-specific keyword model 600 can be trained with the user's own voice speaking the designated keyword (e.g., during an enrollment operation for the user and the media output device 150 conducted using the electronic device 104). In this example, a user-specific keyword model 600T undergoing training may be provided with designated keyword input samples (e.g., audio samples of the user speaking their own name, one or more variants of their own name such as nicknames, and/or any other designated keywords that the user would like to designate as a trigger of an interrupt of a noise-cancelling mode of operation of media output device 150) as input training data. As shown, the user-specific keyword model 600T undergoing training can also, or alternatively, receive keyword features, extracted from the designated keyword self-input samples by the feature extraction engine 504, as input training data. As shown in the example of FIG. 7, during training, the user-specific keyword model 600T may output a confidence that the external voice input includes a designated keyword, and compare the confidence with a known confidence (e.g., a confidence level of one or one hundred percent) using a cost function to generate feedback for training the parameters (e.g., weights) of the user-specific keyword model 600.

In one or more implementations, the user-specific keyword model 600 may be implemented at the media output device 150 for triggering an interrupt of a noise-cancelling mode of operation, or for initiating a further determination by electronic device 104 of whether the external voice input corresponds to an interrupt-authorized contact. For example, in some implementations, a person 202 speaking the name of the user 101 may be sufficient to indicate that the interrupt can be triggered. In other implementations, a person 202 speaking the name of the user 101 may be an initial trigger for further operations to determine whether to interrupt the user. In one or more implementations the user-specific keyword model 600 may be trained at the electronic device 104 (or at another electronic device of the user 101) and then deployed to the media output device 150.

Figure 8:
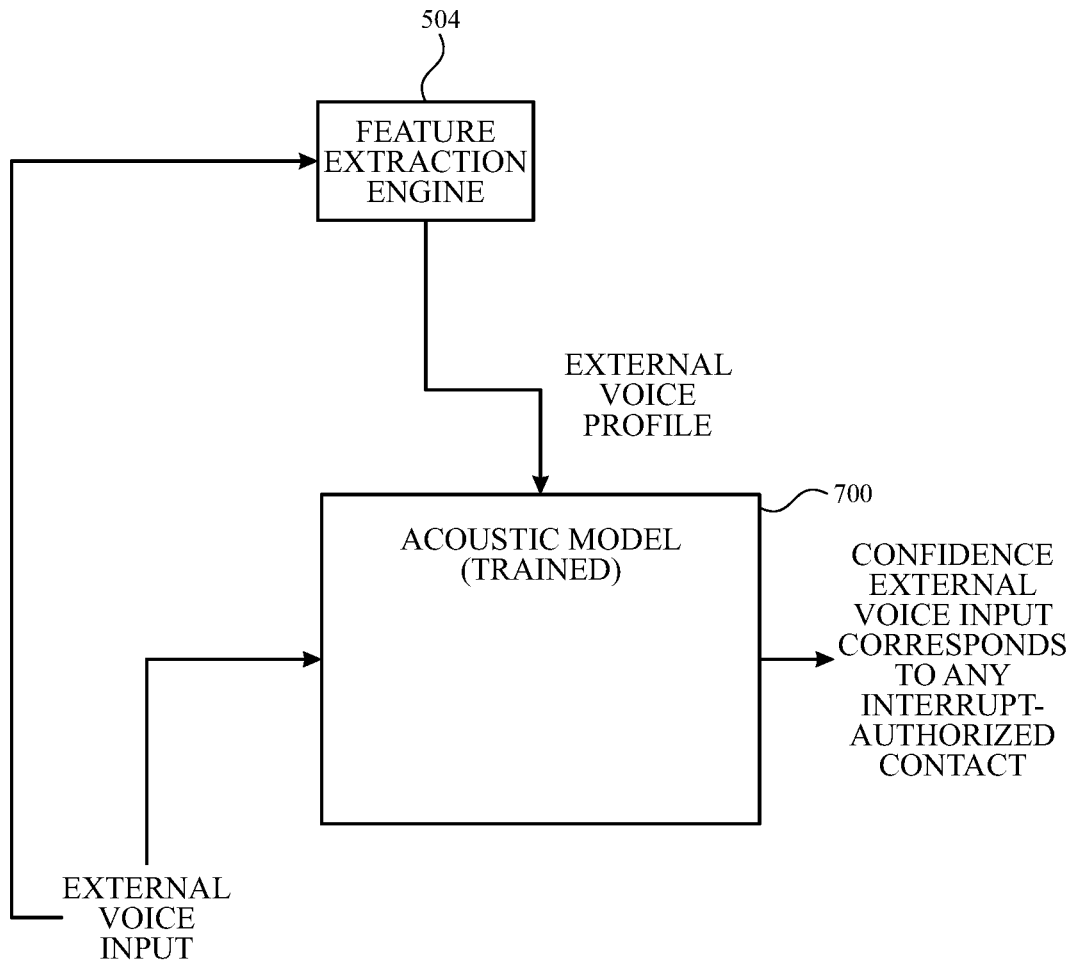
FIG. 8 illustrates a schematic flow diagram for determining whether an external voice input corresponds to a potential interrupt-authorized contact using an acoustic model in accordance with implementations of the subject technology.

In the example of FIG. 8, an external voice input, such as a voice input including one or more words spoken by a person 202 to a user 101 that is wearing an media output device 150, can be received at the media output device. In various implementations, the media output device 150 or an associated electronic device such as electronic device 104, can include a trained acoustic model 700 that has been trained to determine whether the external voice input corresponds to a potential interrupt-authorized contact. For example, to utilize the relatively low power and/or low memory computing resources of the media output device 150, the media output device can be provided with a relatively small (e.g., low accuracy) machine learning model that is able to determine, based on the external voice input, a confidence that the external voice input corresponds to any (e.g., any one of a group) interrupt-authorized contact at the electronic device 104. In one or more implementations, a determination, by the acoustic model 700, that the external voice input corresponds to any interrupt-authorized contact at the electronic device 104 (e.g., based on a confidence above a threshold that the external voice input corresponds to a potential interrupt-authorized contact) may cause the media output device 150 to trigger an interrupt of a noise-cancelling mode of operation, or to request a determination, by electronic device 104, of whether the external voice input corresponds to a interrupt-authorized contact (e.g., using a more accurate acoustic model deployed at the electronic device). As shown in FIG. 8, in various implementations, the acoustic model 700 may be trained to recognize a potential interrupt-authorized contact based on an external voice input itself, or based on external voice profile extracted from the external voice input by the feature extraction engine 504.

Figure 9:
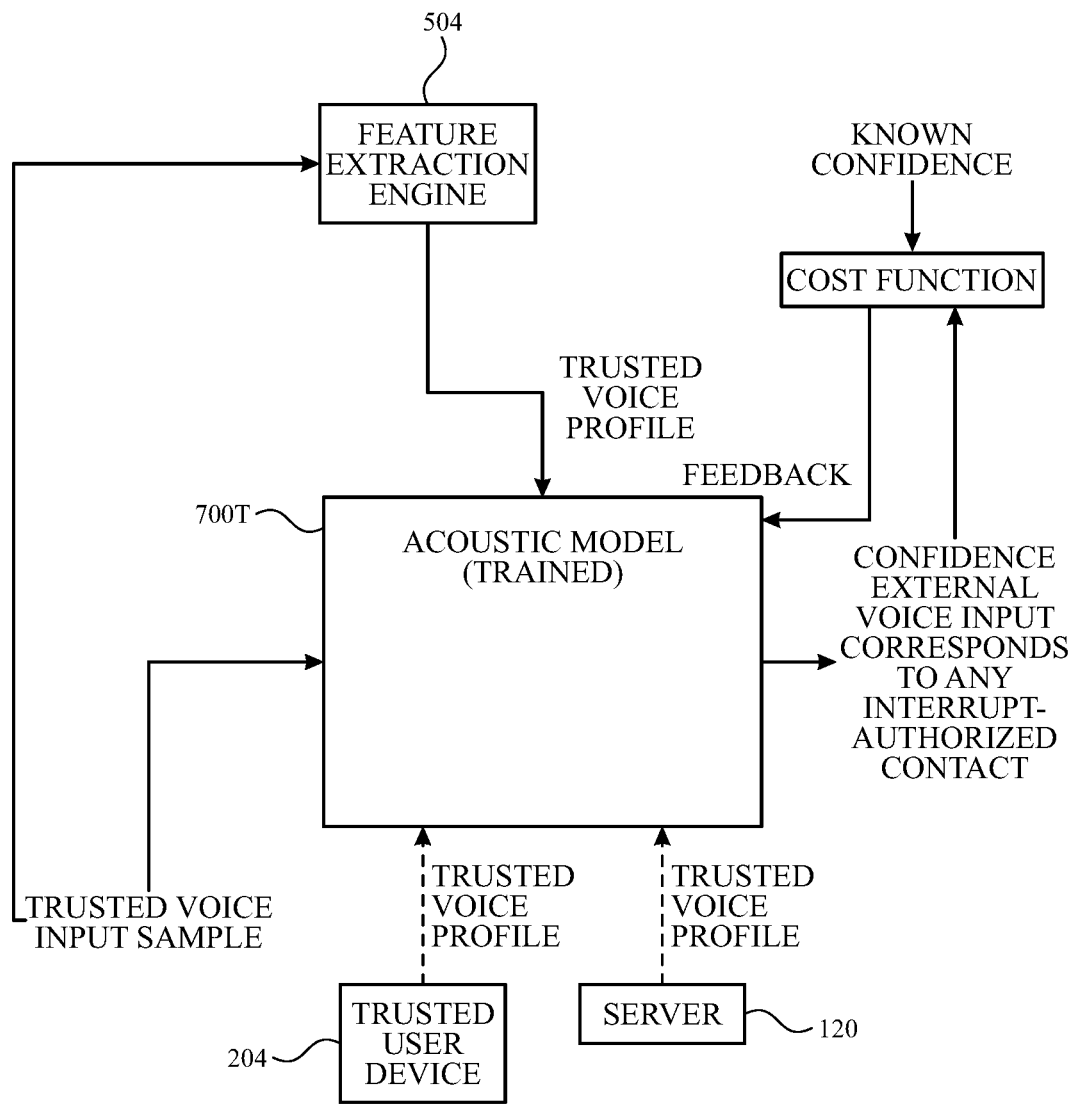
FIG. 9 illustrates schematic flow diagram for training an acoustic model to recognize an interrupt-authorized contact in accordance with implementations of the subject technology.

FIG. 9 illustrates a training operation for the acoustic model 700 to recognize a potential interrupt-authorized contact in accordance with one or more implementations. As shown in FIG. 9, acoustic model 700T undergoing training can be provided with a sample input of a trusted voice (e.g., to a microphone of media output device 150 or a microphone of electronic device 104) and/or a trusted voice profile extracted from a trusted voice sample using feature extraction engine 504. As indicated in FIG. 9, the acoustic model 700T undergoing training can also, or alternatively, be provided with a trusted voice profile received from a device of a trusted user (e.g., from electronic device 204 or a person 202 that the user of media output device 150 desires to designate as an interrupt authorized contact) or from a remote server such as server 120 (e.g., responsive to receiving consent from the trusted person for obtaining the trusted voice profile). The trusted voice profiles of FIG. 9 may correspond, for example, to the voice profiles (VPs) described above in connection with FIG. 5.

As shown in the example of FIG. 9, during training, the acoustic model 700T may output a confidence that the external voice input corresponds to any interrupt-authorized contact, and compare the confidence with a known confidence (e.g., a confidence level of one or one hundred percent) using a cost function to generate feedback for training the parameters (e.g., weights) of the acoustic model 700. In the example of FIGS. 8 and 9, the acoustic model 700 may be provided with sufficient numbers of layers, nodes, and/or corresponding parameters (e.g., weights and/or biases) to enable recognition that one of a group of interrupt-authorized contacts provided an external voice input, without having a sufficient numbers of layers, nodes, and/or corresponding parameters (e.g., weights and/or biases) to enable recognition of which interrupt-authorized contact of the group of interrupt-authorized contacts provided the external voice input. The acoustic model 700 may be trained to recognize the potential interrupt-authorized contact based on the voice profile of the external voice input, regardless of what words are spoken in the external voice input (e.g., without recognition of any keywords).

In one or more implementations, the acoustic model 700 may be implemented at the media output device 150 for triggering an interrupt of a noise-cancelling mode of operation, or for initiating a further determination by electronic device 104 of whether the external voice input corresponds to an interrupt-authorized contact. In one or more implementations the acoustic model 700 may be trained at the electronic device 104 (or at another electronic device of the user 101) and then deployed to the media output device 150.

Figure 10:
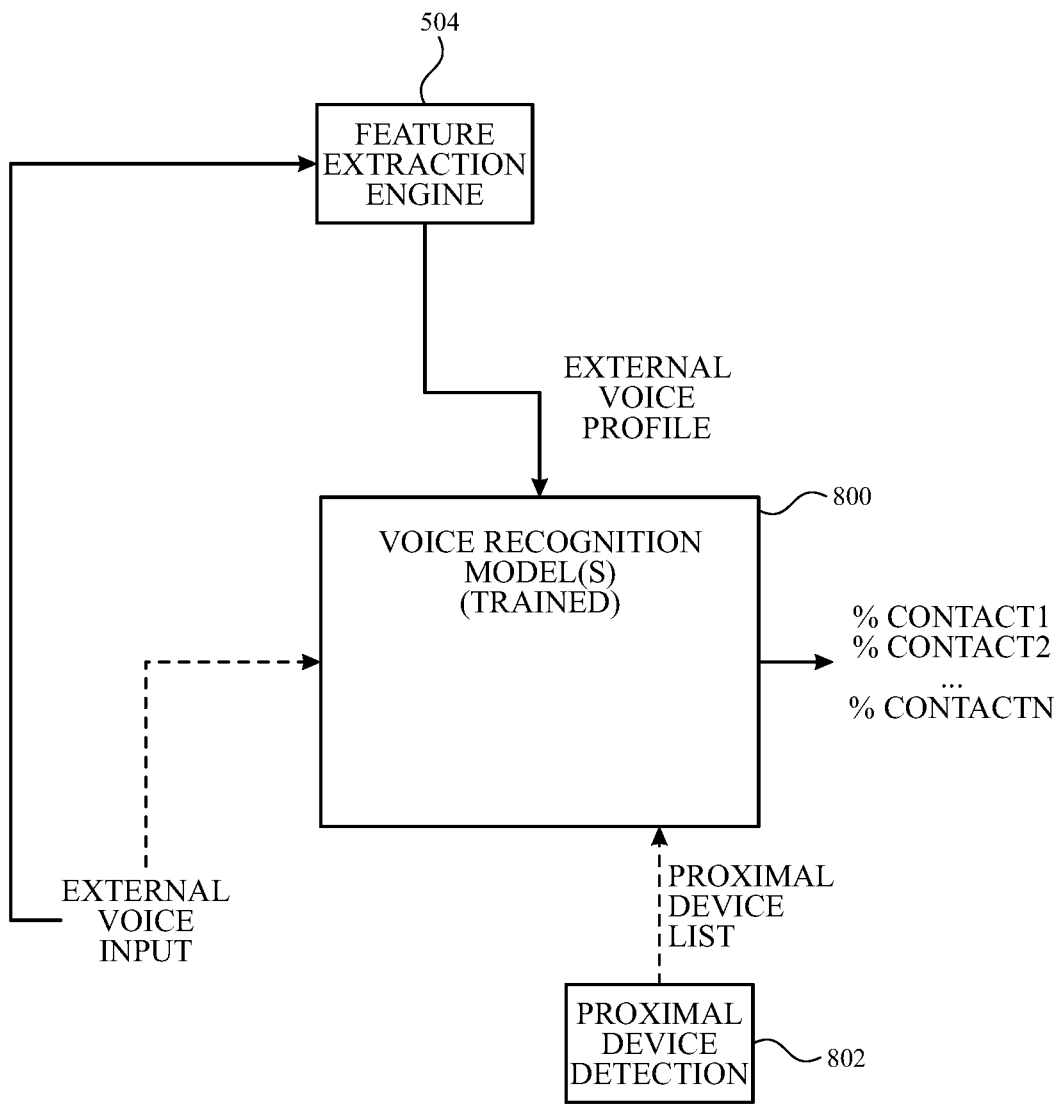
FIG. 10 illustrates a schematic flow diagram for determining whether an external voice input corresponds to an interrupt-authorized contact using an acoustic model implemented as a voice recognition model in accordance with implementations of the subject technology.

FIG. 10 illustrates an example in which an acoustic model implemented as a voice recognition model 800 is provided (e.g., at the media output device 150 or at electronic device 104) for recognition of an interrupt-authorized contact. As shown in FIG. 10, an external voice input may be received from a person other than the user of the media output device 150 and the electronic device 104. As shown, the external voice input may be provided directly to an acoustic model implemented as a voice recognition model 800, or an external voice profile can be extracted from the external voice input using feature extraction engine 504 and provided to the voice recognition model 800. In the example of FIG. 10, the voice recognition model 800 outputs a likelihood (e.g., a percent likelihood or other likelihood or confidence statistic) that the external voice input and/or the external voice profile corresponds to each of one or more of the contacts (e.g., contact1 through contactN) for the user. In one or more implementations, the contact with the highest likelihood may be identified as the contact corresponding to the external voice input. In one or more implementations, it can then be determined whether the identified contact is designated, at electronic device 104, as an interrupt-authorized contact. However, it should also be appreciated that the voice recognition model 800 can output a contact identifier for a single identified contact, or a determination of whether the external voice input corresponds to an interrupt-authorized contact without outputting information identifying which contact.

As indicated in FIG. 10, in one or more implementations, voice recognition model 800 may also receive additional information as input, such as a list of proximal devices from a proximal device detection engine 802. In one or more implementations, the proximal device list may be obtained based on communications between the electronic device 104 of the user and one or more nearby devices, and used to confirm the presence of a contact that has been identified by the voice recognition model 800, or used within the model to enhance the likelihood of detection of the users of the proximal devices as interrupt-authorized contacts. In one or more implementations, the voice recognition model 800 may be executed by electronic device 104 based on a request from media output device 150, the request including information associated with the external voice input (e.g., the voice input itself, or an external voice profile extracted therefrom).

Figure 11:
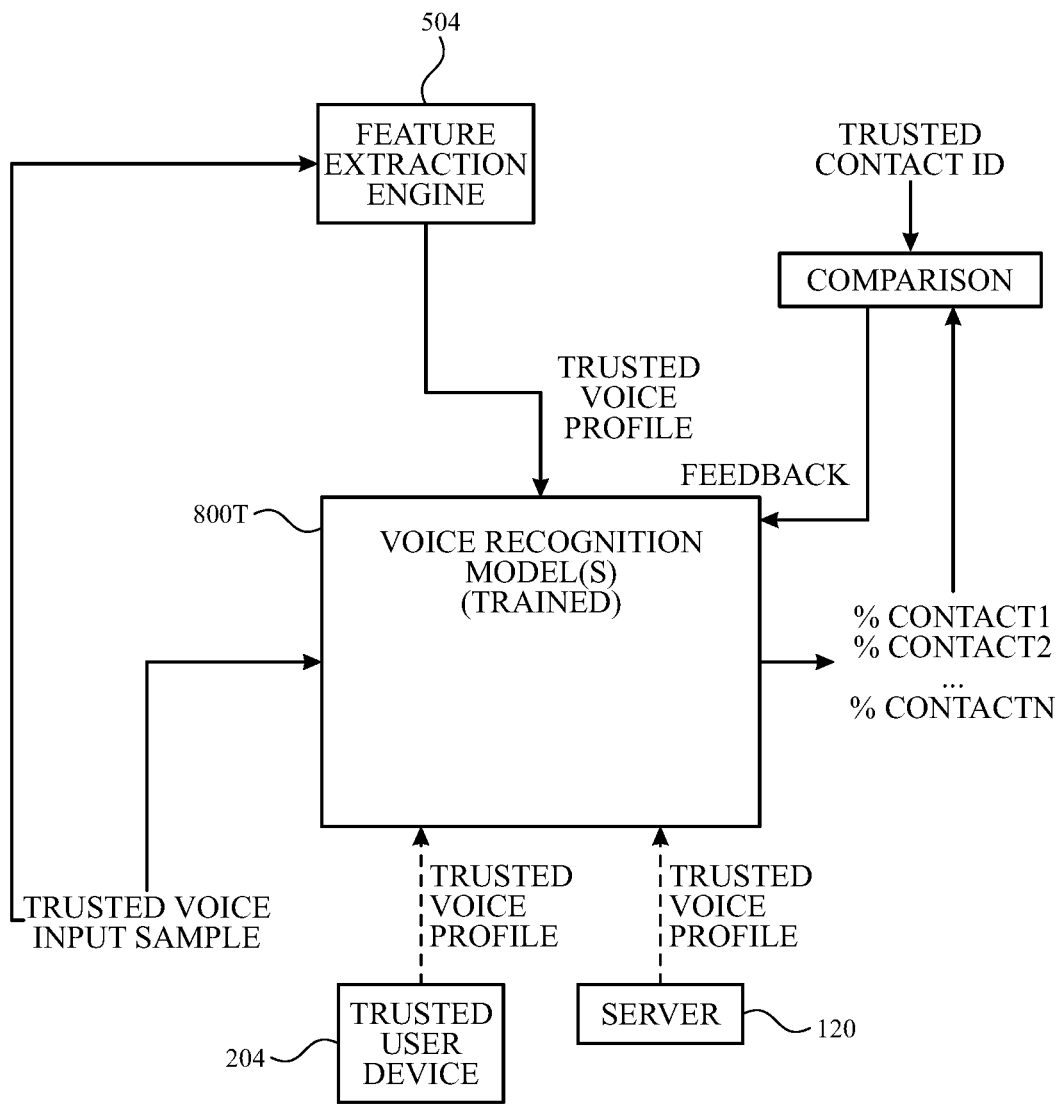
FIG. 11 illustrates schematic flow diagram for training an acoustic model implemented as a voice recognition model in accordance with implementations of the subject technology.

FIG. 11 illustrates a training operation for the acoustic model implemented as the voice recognition model 800 to recognize an interrupt-authorized contact in accordance with one or more implementations. As shown in FIG. 11, voice recognition model 800T undergoing training can be provided with a sample input of a trusted voice (e.g., to a microphone of media output device 150 or a microphone of electronic device 104) and/or a trusted voice profile extracted therefrom using feature extraction engine 504. As shown, the trusted voice profile may also, or alternatively, be received from a device of a trusted user (e.g., from electronic device 204 of a person 202 that the user of media output device 150 desires to designate as an interrupt authorized contact) or from a remote server such as server 120 (e.g., responsive to receiving consent from the trusted person for obtaining the trusted voice profile). The trusted voice profiles of FIG. 11 may correspond, for example, to the voice profiles (VPs) described above in connection with FIG. 5.

As shown in the example of FIG. 11, during training, the voice recognition model 800T undergoing training may output a confidence that the external voice input corresponds to each of several contacts or each or several interrupt-authorized contacts, and compare the resulting identified contact(s) with a known contact identifier (e.g., an identifier of the contact for which the trusted voice input sample was obtained) using a cost function to generate feedback for training the parameters (e.g., weights) of the voice recognition model 800. In the example of FIGS. 10 and 11, the voice recognition model 800 may be provided with sufficient numbers of layers, nodes, and/or corresponding parameters (e.g., weights and/or biases) to enable recognition of an individual interrupt-authorized contact 302, and/or which interrupt-authorized contact of a group of interrupt-authorized contacts 302, provided the external voice input. As indicated in FIGS. 10 and 11, the voice recognition model 800 may recognize the interrupt-authorized contact based on the voice profile of the external voice input, regardless of what words are spoken in the external voice input (e.g., without recognition of any keywords).

In various implementations, any of the acoustic models of FIGS. 6, 8, and 10 can be implemented as any of the acoustic models 304 and 308 of FIG. 3.

Figure 12:
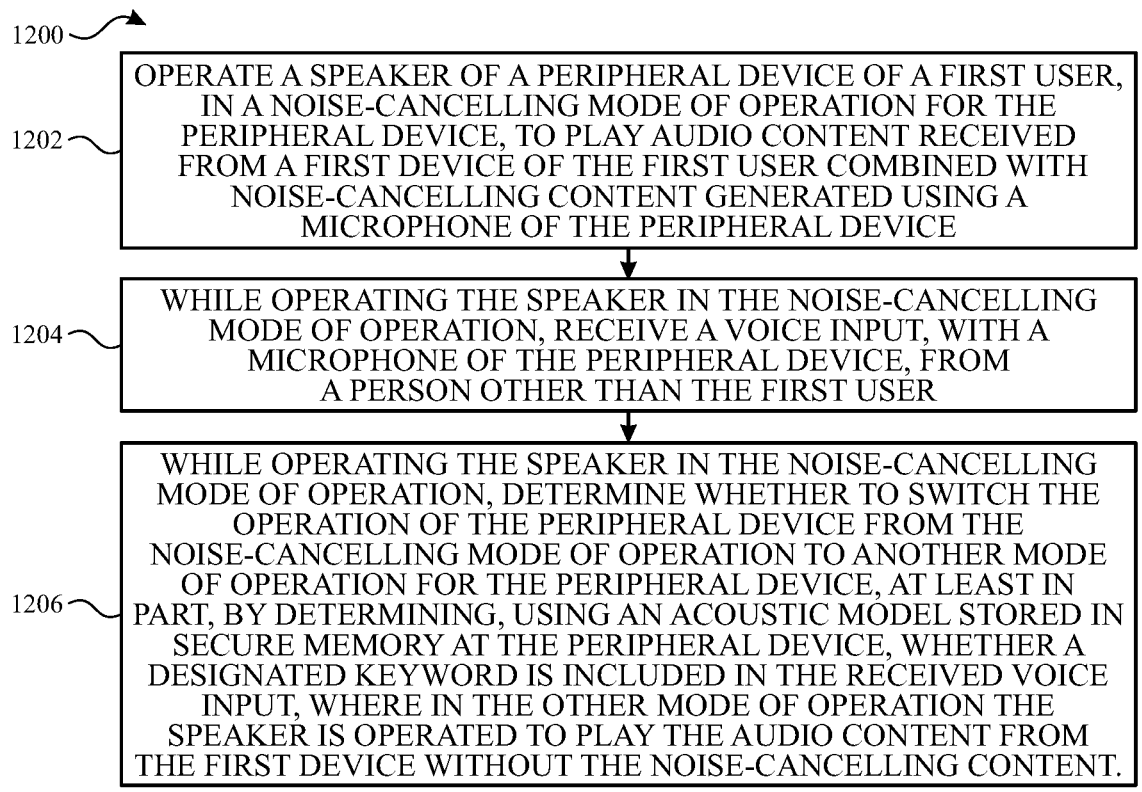
FIG. 12 illustrates a flow diagram for an example process for operating a media output device having a noise-cancelling mode of operation.

FIG. 12 illustrates a flow diagram of an example process 1200 operating an audio device having a noise-cancelling mode of operation in accordance with implementations of the subject technology. For explanatory purposes, the process 1200 is primarily described herein with reference to the media output device 150 and electronic device 104 of FIGS. 1-5. However, the process 1200 is not limited to the media output device 150 and electronic device 104 of FIGS. 1-5, and one or more blocks (or operations) of the process 1200 may be performed by one or more other components of other suitable devices, including the electronic device 110, the electronic device 115, and/or the servers 120. Further for explanatory purposes, some of the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

As illustrated in FIG. 12, at block 1202, a speaker such as speaker 151 of a peripheral device such as media output device 150 (e.g., an audio device) of a first user such as user 101, is operated in a noise-cancelling mode of operation for the peripheral device, to play audio content received from a first device (e.g., electronic device 104) of the first user combined with noise-cancelling content generated using a microphone such as microphone 152 of the peripheral device.

At block 1204, while operating the speaker in the noise-cancelling mode of operation, the peripheral device (e.g., media output device 150) receives a voice input, with the microphone 152 of the peripheral device, from a person (e.g., person 202) other than the first user.

At block 1206, the peripheral device determines whether to switch the operation of the peripheral device from the noise-cancelling mode of operation to another mode of operation for the peripheral device, at least in part, by determining, using an acoustic model (e.g., one of acoustic models 308) stored in secure memory (e.g., secure memory 305) at the peripheral device, whether a designated keyword is included in the received voice input. In the other mode of operation the speaker is operated to play the audio content from the first device without the noise-cancelling content. In one or more implementations, the designated keyword includes at least a portion or a variant of a name of the first user.

In one or more implementations, the acoustic model (e.g., one of acoustic models 308) has been trained, with the first device (e.g., electronic device 104), to determine whether the designated keyword is included in received voice inputs from persons other than the first user, based on a training voice input including the designated keyword and provided by the first user (e.g., by the user 101 speaking their own name or a variant thereof during an initiation or enrollment session for the first user with the electronic device 104).

In one or more implementations the peripheral device may also receive additional audio content from a second device (e.g., electronic device 110 or electronic device 115) of the first user. The peripheral device may operate the speaker 151 to play the additional audio content from the second device of the first user, combined with additional noise cancelling content generated using the microphone 152, in the noise-cancelling mode of operation. While operating the speaker 151 to play the additional audio content combined with the additional noise cancelling content generated using the microphone 152 in the noise-cancelling mode of operation, the peripheral device (e.g., media output device 150) may receive an additional voice input, with the microphone, from the person (e.g., person 202 or another person) other than the first user.

In one or more implementations, the peripheral device may then determine whether to switch the operation of the peripheral device from the noise-cancelling mode of operation to the other mode of operation, at least in part, by determining, using the acoustic model (e.g., one of acoustic models 308), whether the designated keyword is included in the received additional voice input (e.g., whether the person said the name of the user 101 or a nickname of the user 101). In one or more implementations, the peripheral device may then determine whether to switch the operation of the peripheral device from the noise-cancelling mode of operation to the other mode of operation, at least in part, by determining whether the additional voice input corresponds to an interrupt-authorized contact 302 stored at the first device (e.g., electronic device 104).

In one or more implementations, the peripheral device may also determine whether the designated keyword is included in the received voice input at the peripheral device, and then request, from the first device and responsive to the identification of the designated keyword by the peripheral device, a determination (e.g., by the electronic device 104) of whether the person is one of one or more interrupt-authorized contacts 302 stored at the first device.

In one or more implementations, the peripheral device (e.g., media output device 150) may include a contact or touch sensor that can be used to determine whether the peripheral device is in contact with a portion of a of the first user body (e.g., whether the earbud is being worn into the ear of the user) prior to operating the speaker or the microphone.

Figure 13:
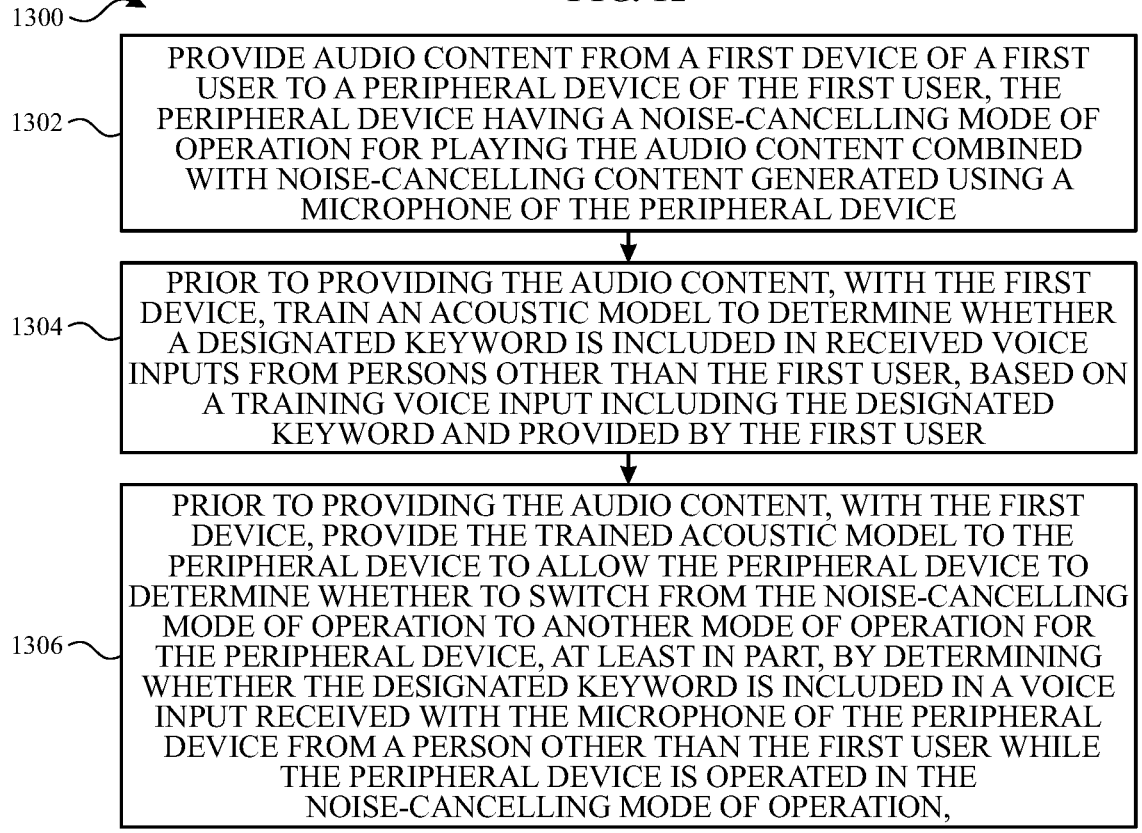
FIG. 13 illustrates a flow diagram for an example process for training an acoustic model for a media output device having a noise-cancelling mode of operation.

FIG. 13 illustrates a flow diagram of an example process 1300 for training an acoustic model, in accordance with implementations of the subject technology. For explanatory purposes, the process 1300 is primarily described herein with reference to the media output device 150 and electronic device 104 of FIGS. 1-5. However, the process 1300 is not limited to the media output device 150 and electronic device 104 of FIGS. 1-5, and one or more blocks (or operations) of the process 1300 may be performed by one or more other components of other suitable devices, including the electronic device 110, the electronic device 115, and/or the servers 120. Further for explanatory purposes, some of the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

As illustrated in FIG. 13, at block 1302, a first device such as electronic device 104 of a first user such as user 101 may provide audio content (e.g., music, audio book content, podcast content, video soundtrack content, or the like) to a peripheral device (e.g., media output device 150) of the first user, the peripheral device having a noise-cancelling mode of operation for playing the audio content combined with noise-cancelling content generated using a microphone 152 of the peripheral device.

At block 1304, the electronic device 104 may also, prior to providing the audio content train (e.g., with model training engine 506 of FIG. 5) an acoustic model (e.g., one or more of acoustic models 308) to determine whether a designated keyword is included in received voice inputs from persons other than the first user, based on a training voice input including the designated keyword and provided by the first user (e.g., by the user 101 speaking their own name and/or variants thereof during an initiation or enrollments session for the first user with the electronic device 104).

At block 1306, the electronic device 104 may provide the trained acoustic model 308 to the peripheral device to allow the peripheral device to determine whether to switch from the noise-cancelling mode of operation to another mode of operation for the peripheral device, at least in part, by determining whether the designated keyword is included in a voice input received with the microphone 152 of the peripheral device from a person (e.g., person 202) other than the first user while the peripheral device is operated in the noise-cancelling mode of operation. In the other mode of operation the peripheral device plays the audio content from the first device without the noise-cancelling content. In one or more implementations, the designated keyword comprises at least a portion of a name of the first user.

In one or more implementations, the electronic device 104 may also receive, from the peripheral device, information (e.g., voice data as in the example of FIG. 3) associated with the voice input. The electronic device 104 may also determine whether to instruct the peripheral device to switch the peripheral device from the noise-cancelling mode of operation to the other mode of operation, at least in part, by determining whether the voice input corresponds to an interrupt-authorized contact 302 stored at the electronic device. In one or more implementations, determining, with the first device, whether to instruct the peripheral device to switch may include determining, with the first device, whether to instruct the peripheral device to switch responsive to an identification of the designated keyword by the peripheral device.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for identifying voices and/or identifying interrupt-authorized contacts.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the of identifying voices and/or identifying interrupt-authorized contacts, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 14:
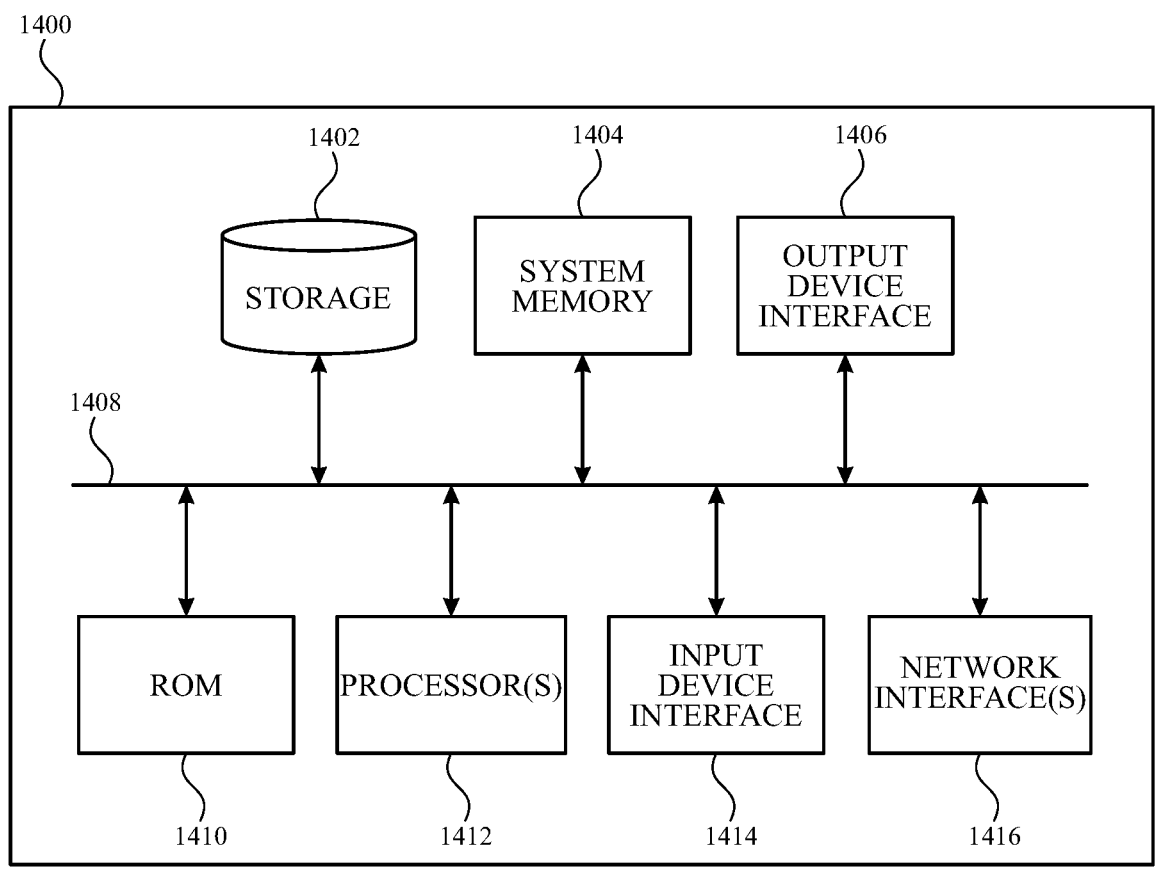
FIG. 14 illustrates an electronic system with which one or more implementations of the subject technology may be implemented.

FIG. 14 illustrates an electronic system 1400 with which one or more implementations of the subject technology may be implemented. The electronic system 1400 can be, and/or can be a part of, the media output device 150, the electronic device 104, the electronic device 110, the electronic device 115, and/or the server 120 as shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410 (which are each implemented as a non-transitory computer-readable medium). From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes, such as the electronic device 110 shown in FIG. 1, through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, a device of a first user is provided, the device including secure memory storing a plurality of contacts including contacts designated at the device as interrupt-authorized contacts for a peripheral device; and one or more processors configured to: provide audio content to the peripheral device, the audio content to be played by the peripheral device in a first mode of operation of the peripheral device or to be played combined with noise cancelling content by the peripheral device in a second mode of operation of the peripheral device; receive, from the peripheral device, information associated with a voice input received by the peripheral device from a person other than the first user during operation of the peripheral device in the second mode of operation; determine, at least in part based on the information received from the peripheral device, whether the person is one of the interrupt-authorized contacts; transmit an instruction to the peripheral device to switch from the second mode of operation to the first mode of operation if it is determined that the person is one of the interrupt-authorized contacts; and transmit an instruction to the peripheral device to continue operation in the second mode of operation if it is determined that the person is not one of the interrupt-authorized contact.

In accordance with aspects of the disclosure, peripheral device of a first user is provided, the peripheral device including: a speaker; a microphone; and processing circuitry configured to: operate the speaker to play audio content received from a first device of the first user in a first mode of operation; operate the speaker to play the audio content combined with noise cancelling content generated using the microphone in a second mode of operation; and while operating the speaker in the second mode of operation: receive a voice input, with the microphone, from a person other than the first user; determine, at least in part using an acoustic model stored in secure memory at the peripheral device, whether the person has been designated, at the first device, as an interrupt-authorized contact; switch the operation of the speaker to the first mode of operation if it is determined that the person is the interrupt-authorized contact; and continue operation of the speaker in the second mode of operation if it is determined that the person is not the interrupt-authorized contact.

In accordance with aspects of the disclosure, device of a first user is provided, the device including: a secure memory; and one or more processors configured to: store, in the secure memory at the device, one or more interrupt-authorized contacts having one or more respective voice profiles; provide audio content to an audio device of the first user, where the audio device is configured to play the audio content in a first mode of operation and to play the audio content combined with noise cancelling content generated using a microphone in a second mode of operation; receive, from the audio device for the first user, information associated with a voice input received at the audio device from a person other than the first user while the audio device is operated in the second mode of operation; determine, by providing the information associated with the voice input to an acoustic model trained using the one or more respective voice profiles, whether the person is one of the one or more interrupt-authorized contacts; and instruct the audio device to switch from the second mode of operation to the first mode of operation if it is determined that the person is one of the one or more interrupt-authorized contacts.

In accordance with aspects of the disclosure, a method is provided that includes operating a speaker of a peripheral device of a first user, in a noise-cancelling mode of operation for the peripheral device, to play audio content received from a first device of the first user combined with noise-cancelling content generated using a microphone of the peripheral device; and while operating the speaker in the noise-cancelling mode of operation: receiving a voice input, with a microphone of the peripheral device, from a person other than the first user; and determining whether to switch the operation of the peripheral device from the noise-cancelling mode of operation to another mode of operation for the peripheral device, at least in part, by determining, using an acoustic model stored in secure memory at the peripheral device, whether a designated keyword is included in the received voice input, where in the other mode of operation the speaker is operated to play the audio content from the first device without the noise-cancelling content.

In accordance with aspects of the disclosure, a method is provided that includes providing audio content from a first device of a first user to a peripheral device of the first user, the peripheral device having a noise-cancelling mode of operation for playing the audio content combined with noise-cancelling content generated using a microphone of the peripheral device; and prior to providing the audio content, with the first device: training an acoustic model to determine whether a designated keyword is included in received voice inputs from persons other than the first user, based on a training voice input including the designated keyword and provided by the first user; and providing the trained acoustic model to the peripheral device to allow the peripheral device to determine whether to switch from the noise-cancelling mode of operation to another mode of operation for the peripheral device, at least in part, by determining whether the designated keyword is included in a voice input received with the microphone of the peripheral device from a person other than the first user while the peripheral device is operated in the noise-cancelling mode of operation, where in the other mode of operation the peripheral device plays the audio content from the first device without the noise-cancelling content.

In accordance with aspects of the disclosure, a semiconductor device is provided that includes processing circuitry (e.g., a processor, an integrated circuit, a chipset, other processing components and/or combinations thereof), the processing circuitry configured to: store, in secure memory at a device of a first user, one or more interrupt-authorized contacts having one or more respective voice profiles; provide audio content to an audio device of the first user, where the audio device is configured to play the audio content in a first mode of operation and to play the audio content combined with noise cancelling content generated using a microphone in a second mode of operation; receive, from the audio device for the first user, information associated with a voice input received at the audio device from a person other than the first user while the audio device is operated in the second mode of operation; determine, by providing the information associated with the voice input to an acoustic model trained using the one or more respective voice profiles, whether the person is one of the one or more interrupt-authorized contacts; and instruct the audio device to switch from the second mode of operation to the first mode of operation if it is determined that the person is one of the one or more interrupt-authorized contacts.

In accordance with aspects of the disclosure, a semiconductor device is provided that includes processing circuitry configured to: operate a speaker of a media output device of a first user to play audio content received from a first device of the first user in a first mode of operation; operate the speaker to play the audio content combined with noise cancelling content generated using a microphone of the media output device in a second mode of operation; and while operating the speaker in the second mode of operation: receive a voice input, with the microphone, from a person other than the first user; determine, at least in part using an acoustic model stored in secure memory at the media output device, whether the person has been designated, at the first device, as an interrupt-authorized contact; switch the operation of the speaker to the first mode of operation if it is determined that the person is the interrupt-authorized contact; and continue operation of the speaker in the second mode of operation if it is determined that the person is not the interrupt-authorized contact.

In accordance with aspects of the disclosure, a device is provided that includes memory; and one or more processors configured to: receive a request to designate a voice profile as an interrupt-authorized voice profile for a media output device associated with the device; provide, to a second device, a request for the voice profile; receive, responsive to the request for the voice profile and responsive to consent from a person corresponding to the voice profile, the voice profile from the second device; and train an acoustic model, using the voice profile, to determine whether to interrupt media content output from the media output device responsive to an external voice input.

In accordance with aspects of the disclosure, a device is provided that include memory; and one or more processors configured to: receive, from a second device, a request for a voice profile of a user of the device, for use in designating the voice profile as an interrupt-authorized voice profile for a media output device associated with the second device; provide, to the user, a request for consent to share the voice profile with the second device; receive the consent from the user; and provide, responsive to receiving the consent, the voice profile to the second device. The second device is configured to train an acoustic model, using the voice profile, to determine whether to interrupt media content output from the media output device responsive to an external voice input to the media output device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A device of a first user, the device comprising:
   secure memory storing a plurality of contacts including contacts designated at the device as interrupt-authorized contacts for a peripheral device; and
   one or more processors configured to:
      provide audio content to the peripheral device, the audio content to be played without noise canceling content by the peripheral device in a first mode of operation of the peripheral device or to be played combined with the noise cancelling content by the peripheral device in a second mode of operation of the peripheral device;
      receive, from the peripheral device, information associated with a voice input received by the peripheral device from a person other than the first user during operation of the peripheral device in the second mode of operation, wherein the information associated with the voice input comprises a voice profile and an indication from a first acoustic model stored in secure memory at the peripheral device that the person is a potential interrupt-authorized contact;
      determine, with a second acoustic model at the device at least in part based on the voice profile and the indication received from the peripheral device, whether the person is one of the interrupt-authorized contacts;
      in response to determining that the peripheral device is operating in the second mode of operation:
         automatically transmit an instruction to the peripheral device to switch from the second mode of operation to the first mode of operation to allow the voice input to pass through if it is determined that the person is one of the interrupt-authorized contacts; and
         transmit an instruction to the peripheral device to continue operation in the second mode of operation if it is determined that the person is not one of the interrupt-authorized contact.

2. The device of claim 1, wherein the interrupt-authorized contacts are not authorized users of the device or the peripheral device, and wherein determining that the person is one of the interrupt-authorized contacts does not provide access, by the person, to any content at or from the device or the peripheral device.

3. The device of claim 1, wherein the one or more voice profiles have been received at the device from a second device of the person or from a remote server.

4. The device of claim 1, wherein the first acoustic model and the second acoustic model have each been trained at the device.

5. The device of claim 4, wherein the second acoustic model has been trained, at the device, using the one or more voice profiles.

6. The device of claim 5, wherein the first acoustic model has been trained, at the device, using a training voice input that includes at least portion of a name of the first user.

7. The device of claim 1, wherein the one or more processors are configured to determine whether the voice profile extracted from the voice input corresponds to one or more voice profiles associated the interrupt-authorized contacts, in part, based on recency information for the plurality of contacts stored at the device, frequency information for the plurality of contacts stored at the device, or a communication between the device and a second device of the person.

8. A peripheral device of a first user, the peripheral device comprising:
   a speaker;
   a microphone; and
   processing circuitry configured to:
      operate the speaker to play audio content received from a first device of the first user without noise canceling content in a first mode of operation;
      operate the speaker to play the audio content combined with the noise cancelling content generated using the microphone in a second mode of operation; and
      while operating the speaker in the second mode of operation:
         receive a voice input, with the microphone, from a person other than the first user;
         determine, at least in part using a first acoustic model stored in secure memory at the peripheral device, whether the person has been designated, at the first device, as an interrupt-authorized contact by:
            determining, using the first acoustic model, that the person is a potential interrupt-authorized contact;
            providing information associated with the voice input to the first device responsive to determining that the person is the potential interrupt-authorized contact; and receiving, from the first device responsive to providing the information to the first device and based on a second acoustic model at the first device, an instruction to switch the operation of the speaker to the first mode of operation; and switch the operation of the speaker to the first mode of operation to allow the voice input to pass through responsive to the instruction.

9. The peripheral device of claim 8, wherein the first acoustic model at the peripheral device has been trained at the first device.

10. The peripheral device of claim 8, wherein the instruction from the first device is based on:
a comparison, at the first device, of the information associated with the voice input to at least one voice profile associated with at least one contact that is identified, in secure memory at the first device, as being interrupt authorized; and
a determination, at the first device, of whether the person is the interrupt-authorized contact based on the comparison.

11. The peripheral device of claim 10, wherein the at least one voice profile has been received at the first device from a second device of the person or from a remote server.

12. The peripheral device of claim 10, wherein the comparison, at the first device, of the information associated with the voice input to at least one voice profile is based on:
an output of a second acoustic model at the first device responsive to the information associated with the voice input, the second acoustic model having been trained, at the first device, using the at least one voice profile.

13. The peripheral device of claim 8, wherein the processing circuitry is configured to determine, using the first acoustic model, that the person is the potential interrupt-authorized contact by determining, using the first acoustic model, that the voice input includes at least portion of a name of the first user.

14. The peripheral device of claim 8, wherein the processing circuitry is configured to determine, using the first acoustic model, that the person is potential interrupt-authorized contact by determining, using the first acoustic model, that the voice input corresponds to a group of interrupt-authorized contacts.

15. The peripheral device of claim 9, wherein the processing circuitry of the peripheral device is configured to determine, at least in part using the first acoustic model at the peripheral device, whether the person has been designated, at the first device, as the interrupt-authorized contact using the first acoustic model and using location information associated with the received voice input, the location information including at least one of proximity information and directional information and having been determined using the microphone and an additional microphone of an additional peripheral device of the first user, the additional peripheral device further including an additional speaker.

16. A semiconductor device comprising processing circuitry configured to:
operate a speaker of a media output device of a first user to play audio content received from a first device of the first user without noise cancelling content in a first mode of operation;
operate the speaker to play the audio content combined with the noise cancelling content generated using a microphone of the media output device in a second mode of operation; and
while operating the speaker in the second mode of operation:
receive a voice input, with the microphone, from a person other than the first user;
determine, at least in part using a first acoustic model stored in secure memory at the media output device, whether the person has been designated, at the first device, as an interrupt-authorized contact by:
determining, using the first acoustic model, that the person is a potential interrupt-authorized contact;
providing information associated with the voice input to the first device responsive to determining that the person is the potential interrupt-authorized contact; and
receiving, from the first device responsive to providing the information to the first device and based on a second acoustic model at the first device, an instruction to switch the operation of the speaker to the first mode of operation; and
switch the operation of the speaker to the first mode of operation to allow the voice input to pass through responsive to the instruction.

17. The peripheral device of claim 8, wherein the instruction is based in part on a recency of communication between an electronic device of the person and the first device.

18. The peripheral device of claim 8, wherein the instruction is based in part on a frequency of communication between an electronic device of the person and the first device.

19. The semiconductor device of claim 16, wherein the instruction is based in part on a recency of communication between an electronic device of the person and the first device.

20. The semiconductor device of claim 16, wherein the instruction is based in part on a frequency of communication between an electronic device of the person and the first device.

* * * * *